US008340469B2

(12) United States Patent
Ohki

(10) Patent No.: US 8,340,469 B2
(45) Date of Patent: Dec. 25, 2012

(54) INFORMATION PROCESSING APPARATUS, INFORMATION PROCESSING METHOD, PROGRAM, AND IMAGE PROCESSING APPARATUS

(75) Inventor: Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 369 days.

(21) Appl. No.: 12/636,073

(22) Filed: Dec. 11, 2009

(65) Prior Publication Data

US 2010/0172589 A1  Jul. 8, 2010

(30) Foreign Application Priority Data

Dec. 16, 2008 (JP) ............... P2008-319109

(51) Int. Cl.
*G06K 9/32* (2006.01)
*G06K 9/34* (2006.01)
*G06K 9/46* (2006.01)
(52) U.S. Cl. ......... 382/294; 382/173; 382/203; 382/298
(58) Field of Classification Search ................. 382/284, 382/294
See application file for complete search history.

(56) References Cited

U.S. PATENT DOCUMENTS

| 6,788,828 | B2 * | 9/2004 | Katayama et al. | 382/284 |
| 7,366,360 | B2 * | 4/2008 | Takiguchi et al. | 382/284 |
| 8,107,769 | B2 * | 1/2012 | Shimizu | 382/284 |
| 2006/0120625 | A1 * | 6/2006 | Peleg et al. | 382/284 |
| 2008/0253687 | A1 * | 10/2008 | Zhang et al. | 382/284 |
| 2010/0220209 | A1 * | 9/2010 | Peleg et al. | 348/222.1 |

FOREIGN PATENT DOCUMENTS

| JP | 09-091407 | 4/1997 |
| JP | 11-205648 | 7/1999 |
| JP | 2000-299804 | 10/2000 |
| JP | 2005-252739 | 9/2005 |

OTHER PUBLICATIONS

Office Action from Japanese Patent Office for Japanese Patent Application No. 2008-319109, mailed Aug. 7, 2012, 4 pages.

* cited by examiner

*Primary Examiner* — Bhavesh Mehta
*Assistant Examiner* — Utpal Shah
(74) *Attorney, Agent, or Firm* — Finnegan Henderson Farabow Garrett & Dunner LLP

(57) ABSTRACT

An information processing apparatus includes a band-shaped area selecting section, an angle selecting section, and a control section. The band-shaped area selecting section selects, from among band-shaped areas each having a first angle with respect to a second direction orthogonal to a first direction, a first band-shaped area having a maximum height, which satisfies a condition that the first band-shaped area is on one side of a first point group, which is in the first direction and on one side of a second point group, which is in a direction opposite to the first direction. The angle selecting section selects a candidate for the first angle. The control section effects control to repeat selecting of the first band-shaped area and selecting of the candidate for the first angle, and obtains the finally selected first band-shaped area as a processing result.

8 Claims, 21 Drawing Sheets

INFORMATION PROCESSING APPARATUS, INFORMATION PROCESSING METHOD, PROGRAM, AND IMAGE PROCESSING APPARATUS

BACKGROUND OF THE INVENTION

1. Field of the Invention

This invention relates to an information processing apparatus, an information processing method, a program, and an image processing apparatus. Particularly, the invention relates to an information processing apparatus and the like for determining a band-shaped rectangular area having a maximum height, which satisfies a condition that the area is on the upper side of a first point group and on the lower side of a second point group.

2. Description of the Related Art

In Japanese Unexamined Patent Application Publication No. 2000-299804 and the like, it has been proposed to create a single panorama from multiple images that are continuously shot by panning. If multiple images have been shot with their vertical positions misaligned, a cropped area (rectangular area) to be cropped as a panorama has to be fixed at the time of creating the panorama from the multiple images. In the past, a user has designated this cropped area manually.

Here, designating a cropped area will be described with reference to a specific example. For example, let a case be considered in which the user captures five images P1-P5 as shown in FIG. 20 while panning a scene of buildings B1-B4 as shown in FIG. 19, and tries to create a single panorama from these five images P1-P5.

A hatched area A1 in FIG. 21 shows an example of a user-designated cropped area. Also, a hatched area A2 in FIG. 22 shows another example of the user-designated cropped area. For panoramas, height is more important than width. Accordingly, it would be better to designate the area A2 shown in FIG. 22 than the area A1 shown in FIG. 21. FIG. 23 shows a panorama PN cropped from the five images P1-P5, using the area A2 of FIG. 22 as a cropped area.

Furthermore, an area A3 shown in FIG. 24 shows still another example of the user-designated cropped area. In this example, there is no pixel data on the hatched area, and thus pixel values cannot be fixed and processing becomes inexecutable. Hence, this area A3 is not desirable.

SUMMARY OF THE INVENTION

As mentioned above, for panoramas, height is more important than width. Hence, it is preferred that a cropped area be selected such that its height is maximized. As also mentioned above, the user designates a cropped area manually. Hence, the user has to spend too much time determining a cropped area, and there is no guarantee that the height of the area the user cropped manually may be maximal.

Accordingly, it is desirable, e.g., to automatically determine a cropped area to be cropped as a panorama from multiple images such that its height is maximized.

According to an embodiment of the present invention, there is provided an information processing apparatus which includes the following elements. A band-shaped area selecting section selects, from among band-shaped areas each having a first angle with respect to a second direction orthogonal to a first direction in which a first point group extends side by side with a second point group, a first band-shaped area having a maximum height, which satisfies a condition that the first band-shaped area is on one side of the first point group, which is in a direction same as or opposite to the first direction and on one side of the second point group, which is in a direction opposite to or same as the first direction. An angle selecting section selects a candidate for the first angle from among angles smaller or larger than the first angle, on the basis of relationships between a first point in the first point group which touches the first band-shaped area, a second point in the second point group which touches the first band-shaped area, and the first angle. A control section effects control to repeat selecting of the first band-shaped area by the band-shaped area selecting section and selecting of the candidate for the first angle by the angle selecting section, and obtains the first band-shaped area finally selected by the band-shaped area selecting section, as a processing result.

In this embodiment, it is the first direction that is the direction in which the first point group extends side by side with the second point group. For example, the first point group may be configured of lower-left and lower-right positions of multiple images captured by sequentially shifting image capturing positions in a horizontal direction, and the second point group may be configured of upper-left and upper-right positions of the multiple images. In this case, the first direction is a vertical direction.

The band-shaped area selecting section selects, from among band-shaped areas each having a first angle with respect to a second direction orthogonal to a first direction, a first band-shaped area having a maximum height, which satisfies a condition that the first band-shaped area is on one side of a first point group, which is in a direction same as or opposite to the first direction and on one side of a second point group, which is in a direction opposite to or same as the first direction.

As mentioned above, if the first point group is configured of the lower-left and lower-right positions of the multiple images and also the second point group is configured of the upper-left and upper-right positions of the multiple images, the band-shaped area selecting section selects, from among band-shaped areas each having the first angle with respect to the horizontal direction, a first band-shaped area having a maximum height, which satisfies the condition that the first band-shaped area is on the upper side of the first point group and on the lower side of the second point group.

Furthermore, the angle selecting section selects a candidate for the first angle from among angles larger or smaller than the first angle, on the basis of relationships between a first point in the first point group which touches the first band-shaped area, a second point in the second point group which touches the first band-shaped area, and the first angle.

For example, in the relationships between the first point, the second point, and the first angle, if the height of the first band-shaped area decreases with increasing current first angle, a candidate for the first angle is selected from among angles smaller than the current first angle. Conversely, for example, in the relationships between the first point, the second point, and the first angle, if the height of the first band-shaped area decreases with decreasing current first angle, a candidate for the first angle is selected from among angles larger than the current first angle.

The control section effects control to repeat selecting of the first band-shaped area by the band-shaped area selecting section and selecting of the candidate for the first angle by the angle selecting section, and obtains the first band-shaped area finally selected by the band-shaped area selecting section, as a processing result. By this control, a band-shaped area having a maximum height is automatically determined, which satisfies the condition that the first band-shaped area is on the upper side of the first point group and on the lower side of the second point group. As mentioned above, if the first point group is configured of the lower-left and lower-right positions of the multiple images and also the second point group is configured of the upper-left and upper-right positions of the multiple images, a band-shaped area for selecting a cropped area (rectangular area) to be cropped as a panorama from the multiple images is automatically determined such that the first band-shaped area is maximized height-wise.

In this embodiment, for example, an area cropping section may further be included which crops a rectangular area sandwiched between the first point group and the second point group, which is selected from the first band-shaped area as the processing result. In this case, a rectangular area having a maximum height, which satisfies the condition that the rectangular area is on the upper side of the first point group and on the lower side of the second point group, can be cropped. For example, a rectangular area having a maximum height can be cropped from multiple images captured by sequentially shifting image capturing positions horizontally, by which a good panorama can be obtained.

DESCRIPTION OF THE PREFERRED EMBODIMENTS

Figure 1:
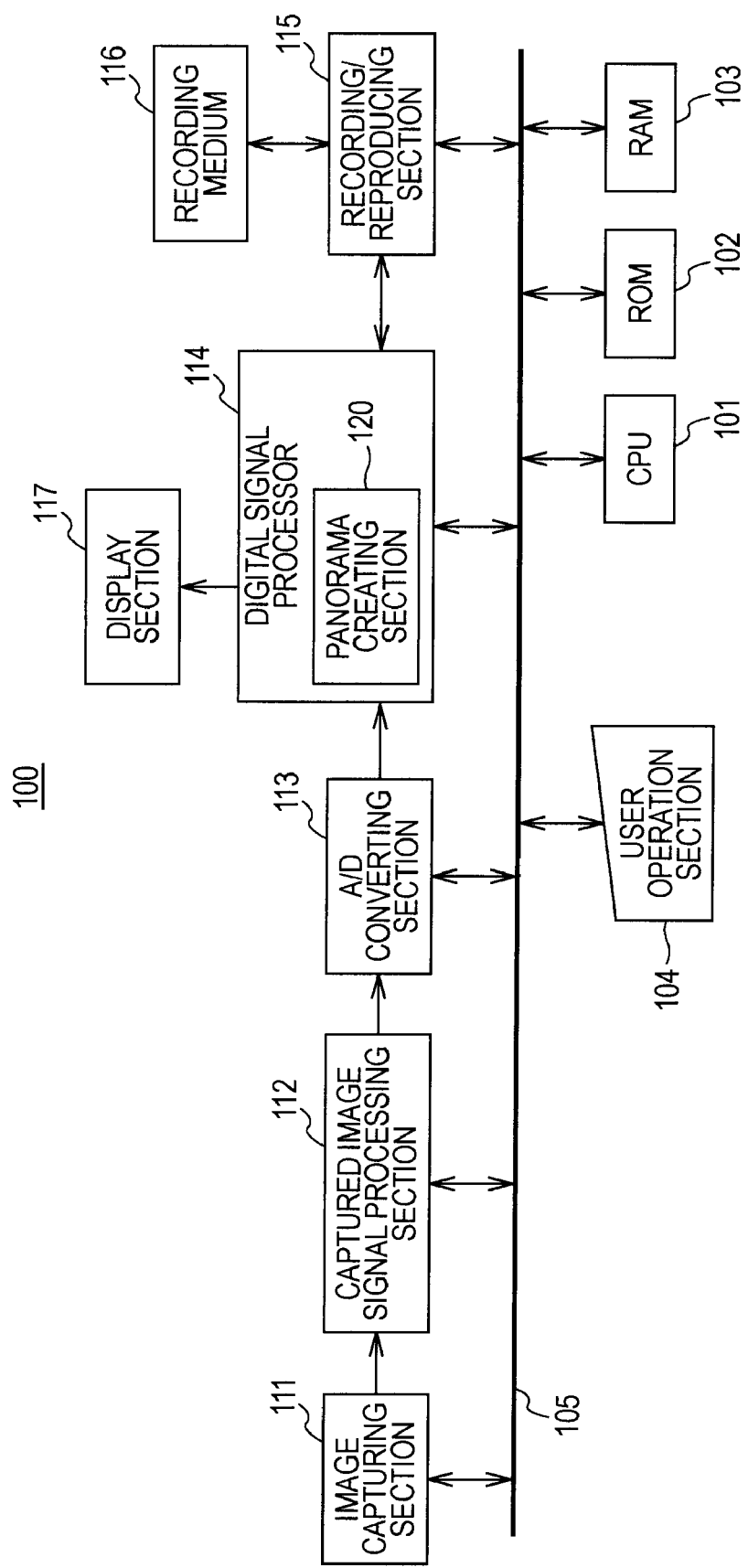
FIG. 1 is a block diagram showing a configuration example of a digital camera according to an embodiment of this invention.

The preferred embodiments (hereinafter denoted "embodiments") of the present invention will now be described in the following sequence.
1. Embodiment
2. Modified embodiment 1. Embodiment Configuration Example of Digital Camera FIG. 1 shows a configuration example of a digital camera 100 according to an embodiment of the present invention. This digital camera 100 has a CPU (Central Processing Unit) 101, a ROM (Read Only Memory) 102, a RAM (Random Access Memory) 103, and a user operation section 104. Also, the digital camera 100 has an image capturing section 111, a captured image signal processing section 112, an A/D (Analog/Digital) converting section 113, a digital signal processor (DSP) 114, a recording/reproducing section 115, and a display section 117.

The CPU 101 controls various parts of the digital camera 100. The ROM 102 holds control programs and the like for the CPU 101. The RAM 103 is used for temporary storage or the like of data necessary for control processing of the CPU 101. The CPU 101 loads programs and data read from the ROM 102, onto the RAM 103 to start the programs, and controls the various parts of the digital camera 100.

The user operation section 104 constitutes a user interface, and is connected to the CPU 101 via a bus 105. This user operation section 104 includes keys, buttons, dials and the like arranged on a housing, not shown, of the digital camera 100. The CPU 101 analyzes information supplied via the bus 105 from the user operation section 104, and performs control corresponding to a user operation.

The image capturing section 111 captures an image of an object, and outputs a captured image signal corresponding to this object. This image capturing section 111 includes a CMOS (Complementary Metal Oxide Semiconductor) image capturing device, or a CCD (Charge Coupled Device) image capturing device. The captured image signal processing section 112 performs processing, such as sample and hold, or gain control, on captured image signals (analog signals) outputted from the image capturing section 111.

The A/D converting section 113 converts the captured image signals outputted from the captured image signal processing section 112 from analog to digital signals. The digital signal processor 114 performs image processing on the captured image signals supplied from the A/D converting section 113. The image processing herein referred to includes white balance processing, gamma correction processing and the like. Since these types of processing are performed in all general-purpose digital cameras, detailed description thereof will be omitted.

In this embodiment, the digital signal processor 114 further includes a panorama creating section 120 performing panorama creating processing. This panorama creating processing is a process for creating a single panorama from multiple images continuously shot by panning, i.e., multiple images captured by sequentially shifting image capturing positions horizontally. Details of this panorama creating processing will be described later.

The digital signal processor 114 transfers processed image data to the display section 117 and the recording/reproducing section 115. The recording/reproducing section 115 writes still image data corresponding to a user's shutter operation, to a mountable recording medium 116, typically a flash memory, or reads still image data from this recording medium. The display section 117 is constructed of, e.g., a display panel such as an LCD (Liquid Crystal Display) disposed, e.g., on the back of the housing of the digital camera 100. This display section 117 displays captured images and images read from the recording medium 116 by the recording/reproducing section 115, as well as various other information for the user.

Next, operations of the digital camera 100 shown in FIG. 1 will be described. The digital camera 100 performs the following operations in a recording mode. A captured image signal acquired by the image capturing section 111 having performed the image capturing processing is supplied to the captured image signal processing section 112, where processing, such as sample and hold, or gain control, is performed. Then, the captured image signal outputted from the captured image signal processing section 112 as an analog signal is converted into a digital signal by the A/D converting section 113, and supplied to the digital signal processor 114. At the digital signal processor 114, the image signal processing, such as white balance processing and gamma correction processing, is performed on the captured image signal supplied from the A/D converting section 113.

The image data acquired through the processing by the digital signal processor 114 is transferred to the display section 117, by which a captured image is displayed on the display section 117, in a monitoring state. In this monitoring state, when the user performs a shutter operation with the user operation section 104, the CPU 101 controls both the digital signal processor 114 and the recording/reproducing section 115, and still image data corresponding to the shutter operation is written to the recording medium 116. In this case, by the user performing a shutter operation while panning, i.e., while sequentially shifting image capturing positions horizontally, the still image data in the form of multiple images to be used for creating a panorama is written to the recording medium 116.

Furthermore, the digital camera 100 performs the following operations in a reproducing mode. That is, at the recording/reproducing section 115, still image data selected by the user operating the user operation section 104 is read. This still image data is supplied from the recording/reproducing section 115 to the display section 117 via the digital signal processor 114, by which a reproduced image is displayed at the display section 117.

[Panorama Creating Processing]

Figure 2:
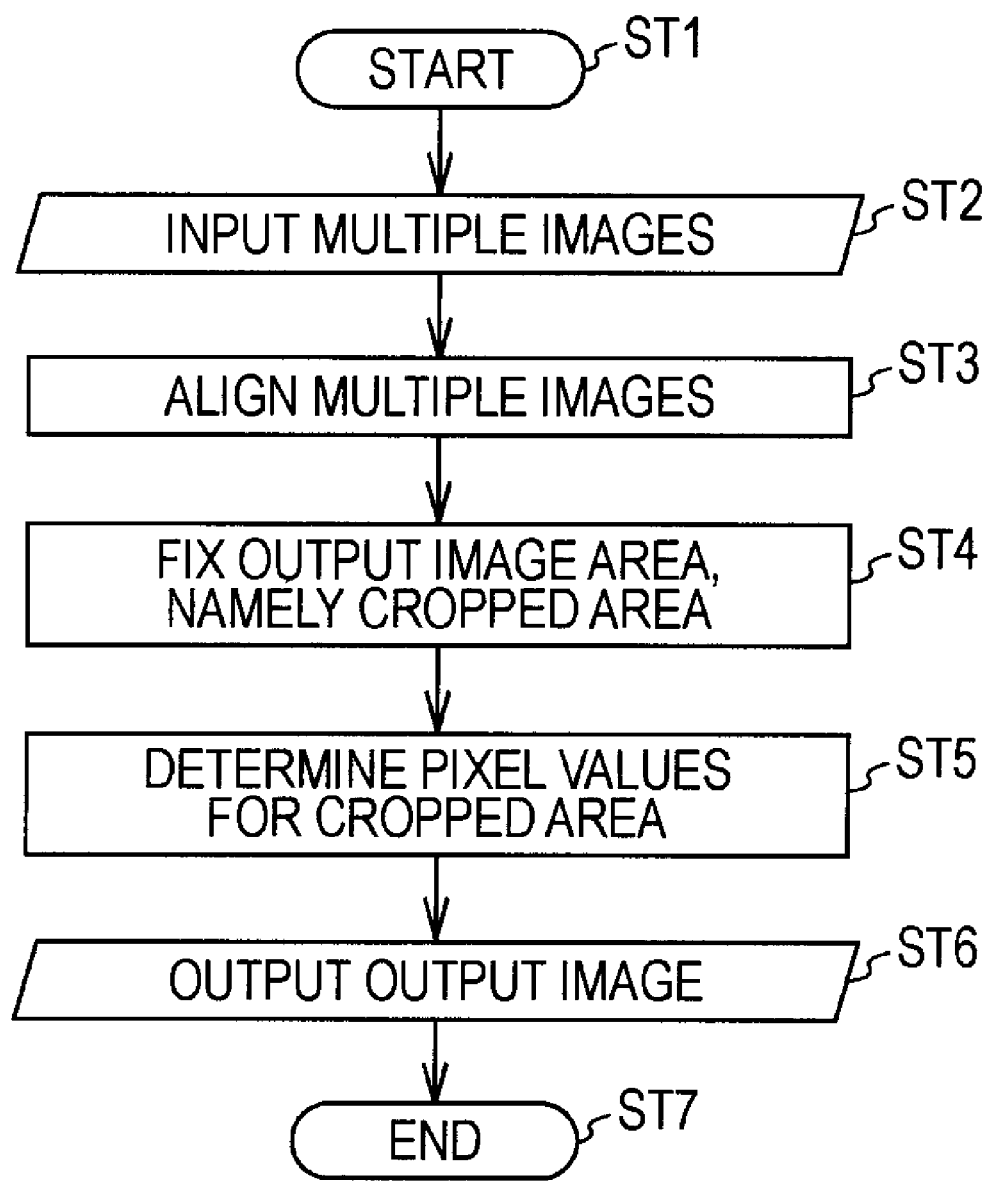
FIG. 2 is a flowchart showing a procedure for panorama creating processing in a panorama creating section.

Next, the panorama creating processing will be described. A panorama is created in the panorama creating section 120 within the digital signal processor 114 under the control of the CPU 101. A flowchart of FIG. 2 shows a procedure for the panorama creating processing in the panorama creating section 120.

When the user operates the user operation section 104 to give an instruction for creating a panorama, the panorama creating section 120 starts, in step ST1, its panorama creating processing. At the time of the instruction for creating a panorama, the user designates multiple images to be used to create a panorama by, e.g., selecting a still image data file recorded in, e.g., the recording medium 116.

Next, in step ST2, the panorama creating section 120 inputs the multiple images to be used to create a panorama. In this case, the panorama creating section 120 reads still image data on the multiple images from the recording medium 116 through the recording/reproducing section 115, and temporarily stores the read data in a memory section, not shown, constructed of a semiconductor memory such as, e.g., an SDRAM.

Next, in step ST3, the panorama creating section 120 aligns the multiple images. For the alignment, the panorama creating section 120 checks correlation between the images. Techniques for checking their correlation include a typical block matching method, details of which will be omitted.

Figure 3:
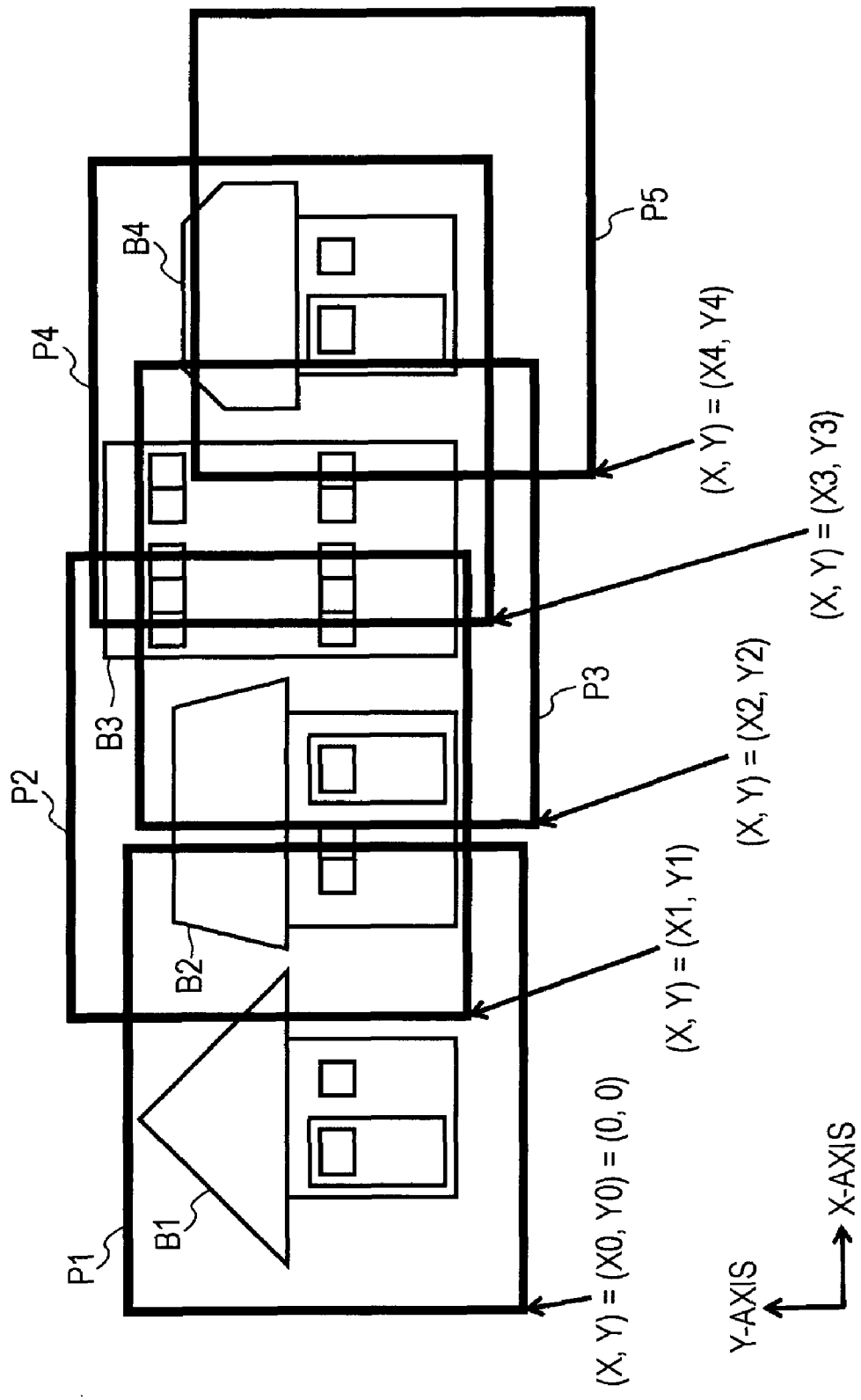
FIG. 3 is a diagram showing a state in which multiple images have their positions fixed by their aligning processing.
Figure 20:
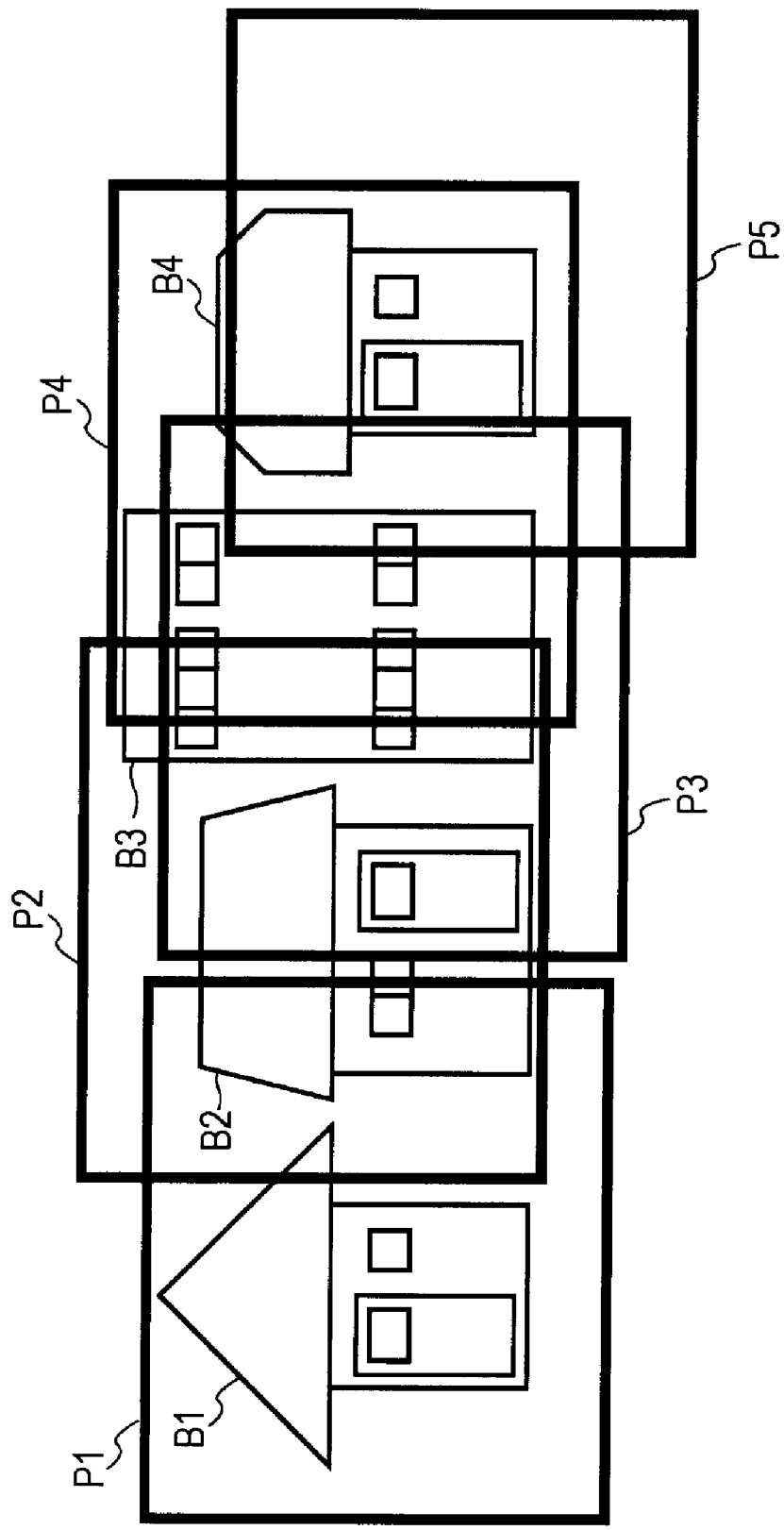
FIG. 20 is a diagram showing an example of multiple images captured by panning the scene.
Figure 21:
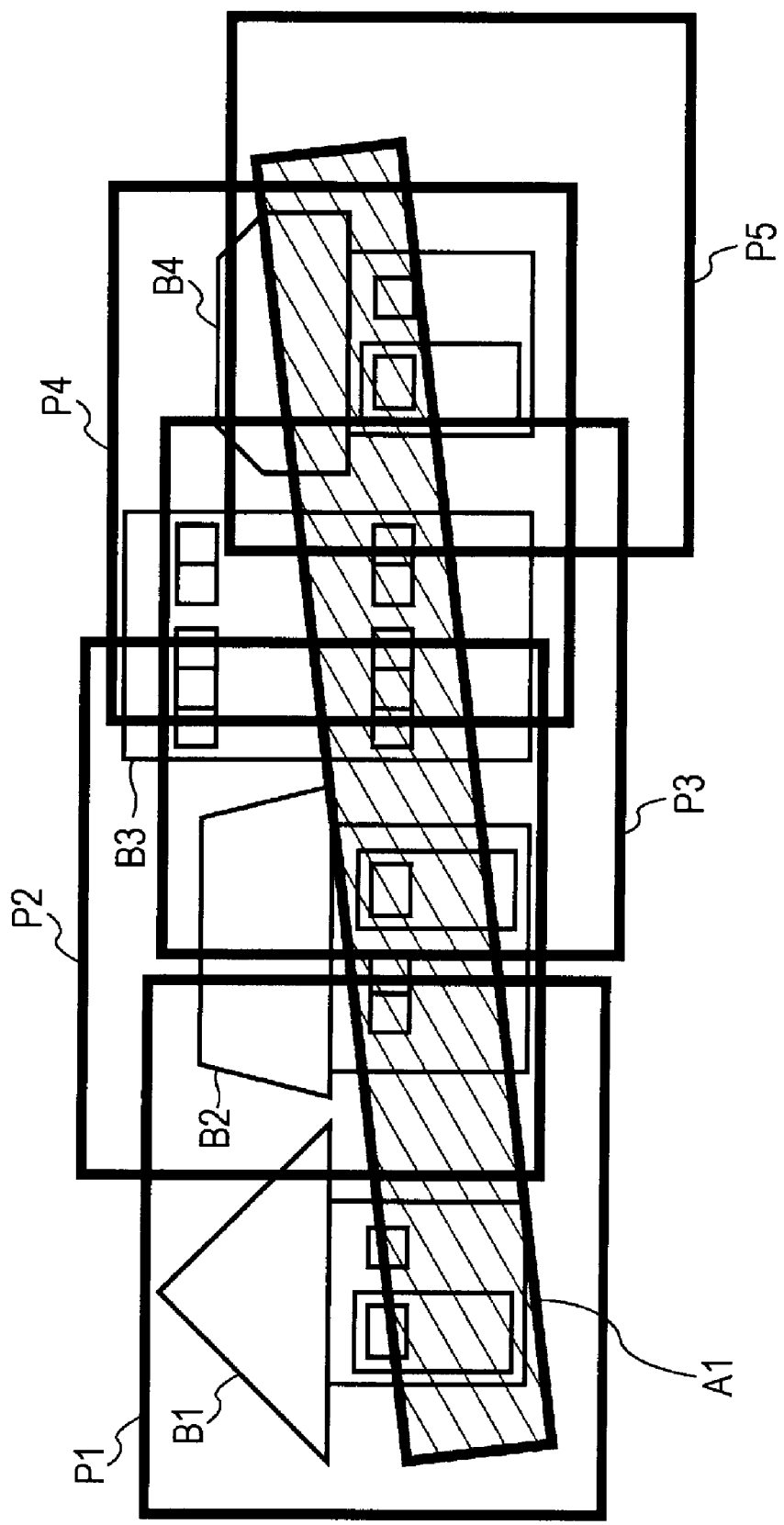
FIG. 21 is a diagram showing an example of a cropped area (rectangular area) designated by a user in order to create a panorama from the multiple images.
Figure 22:
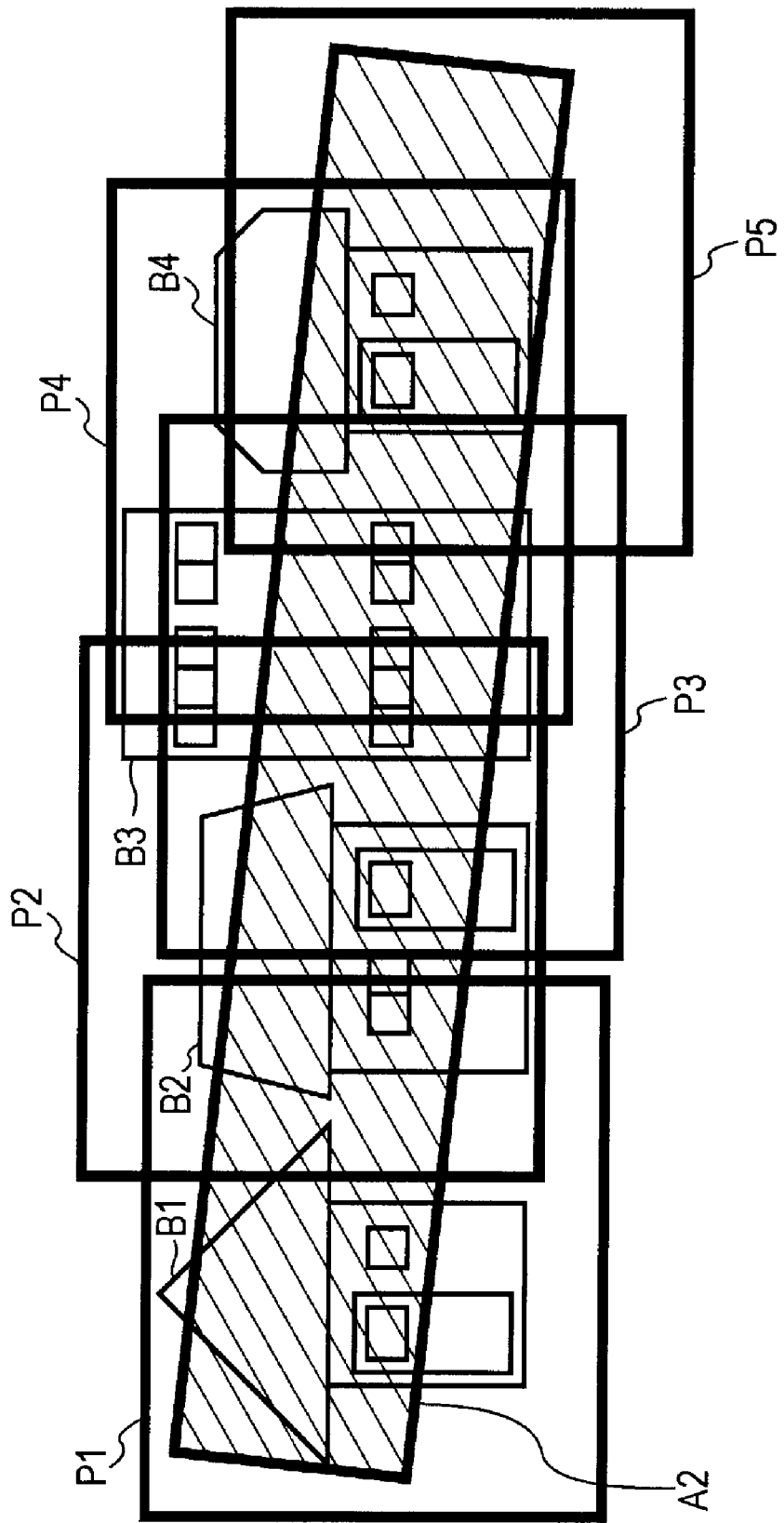
FIG. 22 is a diagram showing another example of the cropped area (rectangular area) designated by the user in order to create a panorama from the multiple images.
Figure 23:
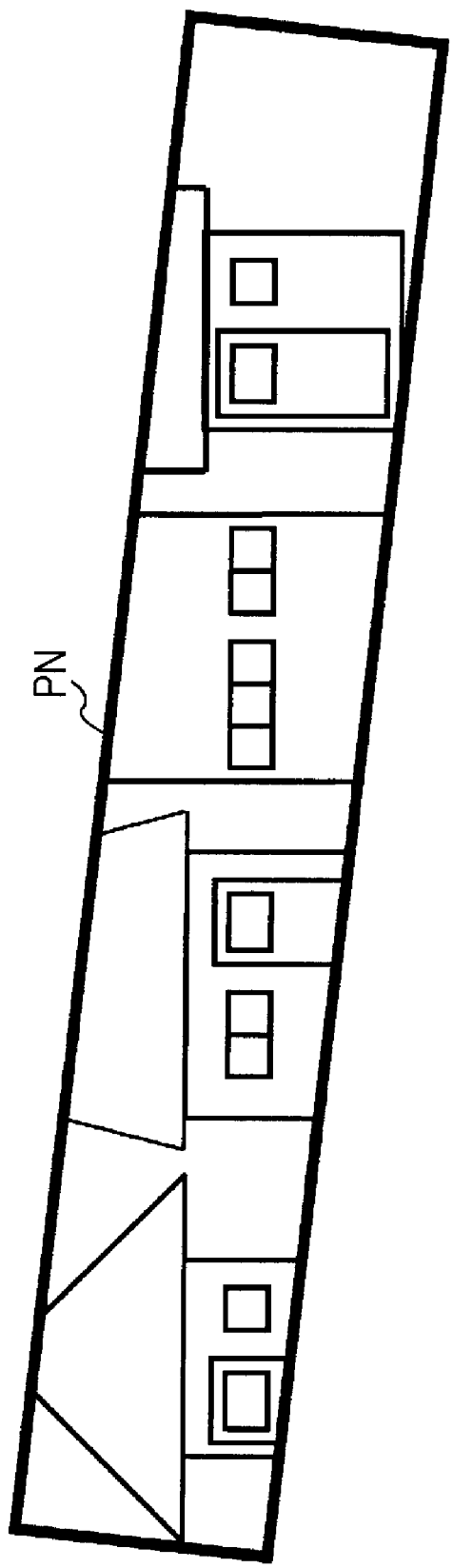
FIG. 23 is a diagram showing an example of a panorama cropped from the multiple images.
Figure 24:
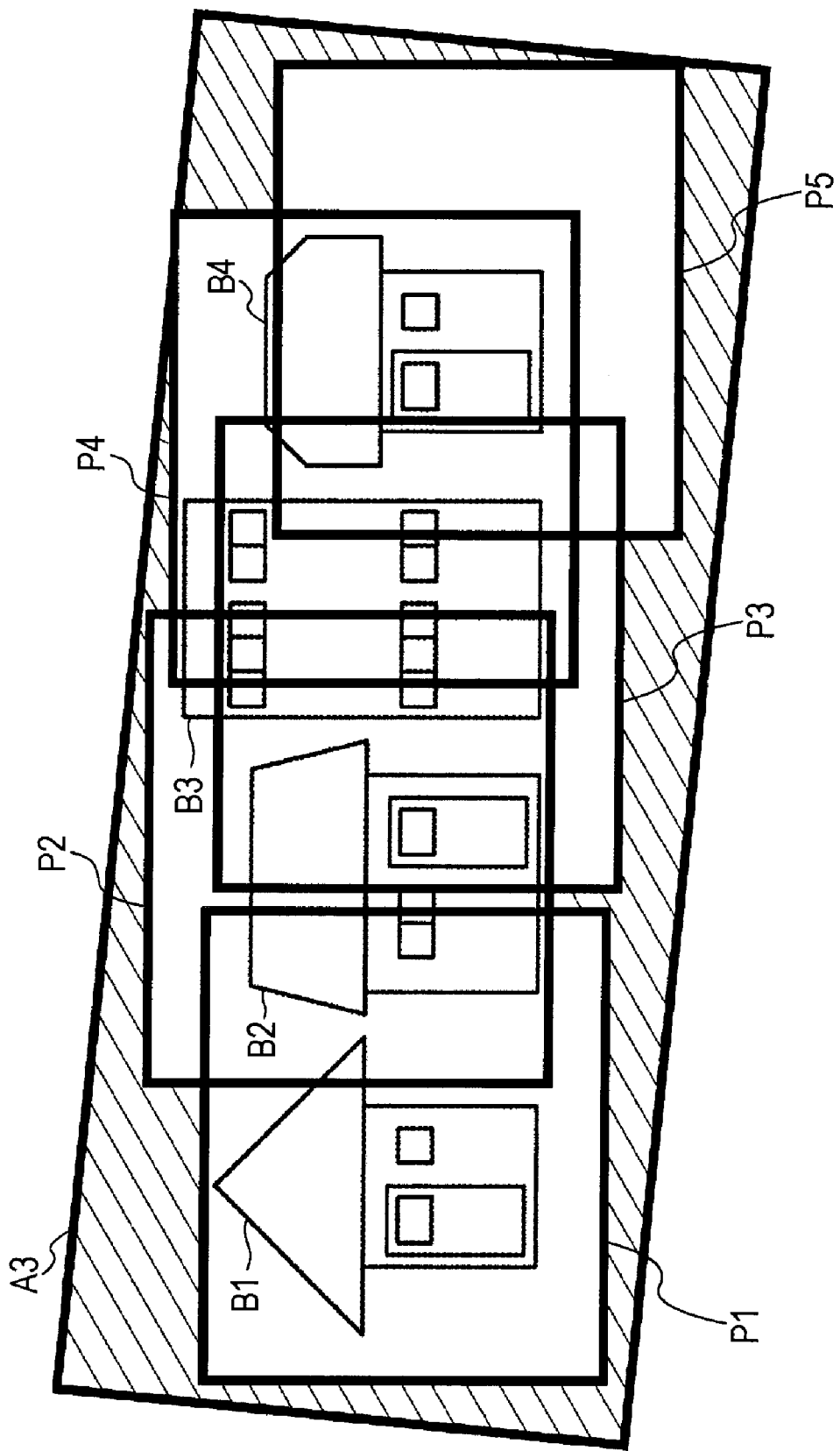
FIG. 24 is a diagram showing still another example of the cropped area (rectangular area) designated by the user in order to create a panorama from the multiple images.

FIG. 3 shows a state in which the multiple images have their positions fixed through their aligning processing. This example shows a case where the above-mentioned five images P1-P5 shown in FIG. 20 have been aligned. Through the aligning processing, lower-left positions (X0,Y0)-(X4, Y4) of the images P1-P5 are fixed. Here, the horizontal axis denotes the X-axis, and the vertical axis denotes the Y-axis, with the lower-left position (X0,Y0) of the image P1 as the origin (0,0). Also, these images are positionally correlated in terms only of horizontal movement components, with no rotational movement components involved.

Figure 4:
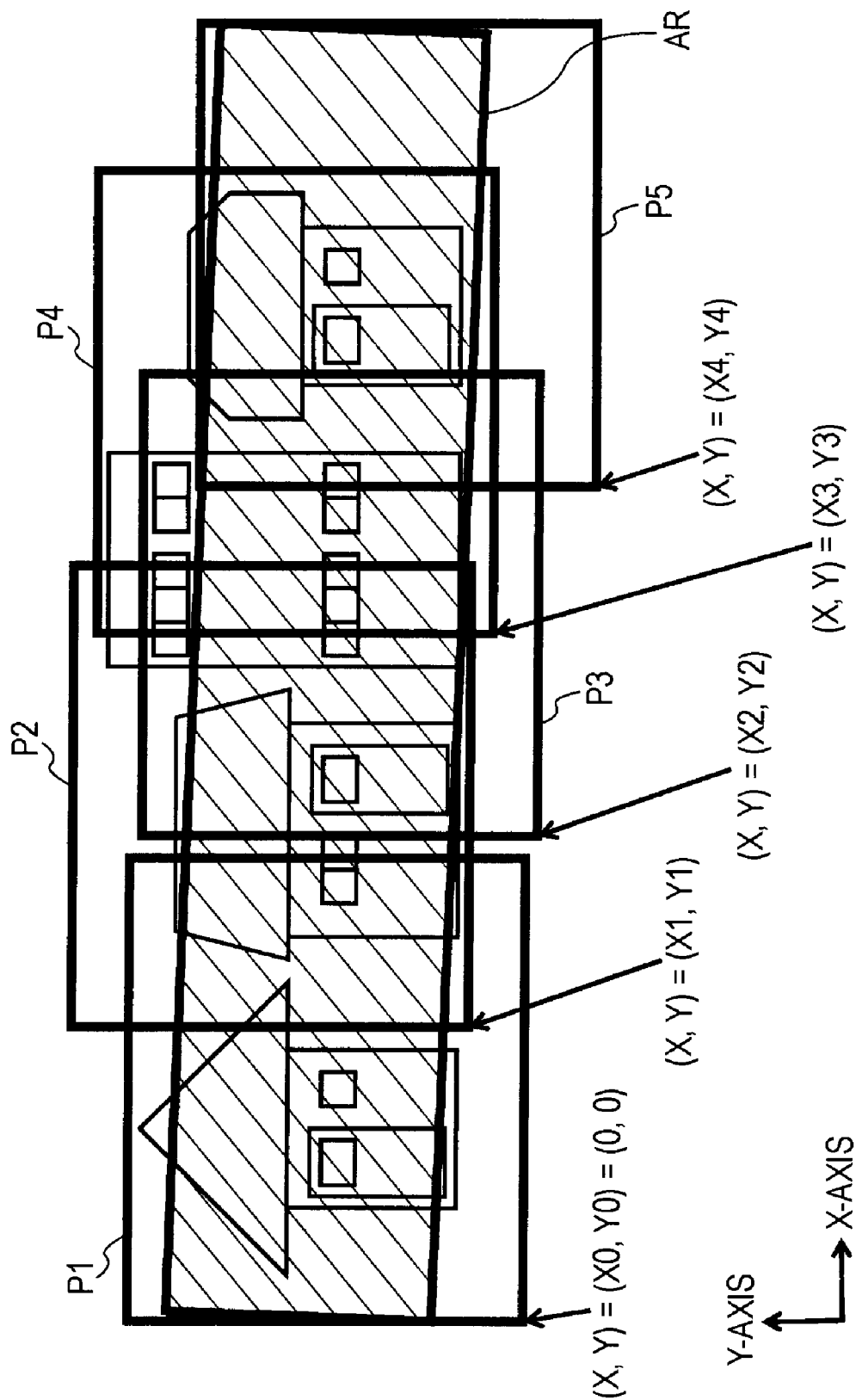
FIG. 4 is a diagram showing an example of a rectangular area fixed as a cropped area at the time of creating a panorama from the multiple images.

Next, in step ST4, the panorama creating section 120 fixes an output image area, i.e., a cropped area to be cropped from the multiple images as a panorama. In this case, a rectangular area, such as a hatched area AR in FIG. 4, is fixed as the cropped area. In this embodiment, this rectangular area is automatically determined so as to be largest height-wise. Details of cropped area fixing processing will be described later.

Next, in step ST5, the panorama creating section 120 determines pixel values at respective positions of the cropped area (see the cropped area AR of FIG. 4) fixed in step ST4 in order to crop an image corresponding to the cropped area from the multiple images. In this case, the value of a pixel in each image, which is positioned identically to a target position in the cropped area, is deemed as the pixel value at the target position. Note that if pixels of multiple images fall on a target position, one may use either a pixel value of any of such images, or an average of the pixel values of such images.

Next, in step ST6, the panorama creating section 120 outputs the image corresponding to the cropped area for which the pixel values have been fixed in step ST5, as an output image (panorama). In this case, the panorama creating section 120 writes still image data on this output image to the recording medium 116, through the recording/reproducing section 115. Note that the still image data on this output image is supplied to the display section 117, and thus the created panorama is displayed on the display section 117, thereby allowing the user to check the created panorama.

After step ST6, the panorama creating section 120 terminates the series of processing steps for creating a panorama, in step ST7.

[Cropped Area Fixing Processing]

Next, details of the above-mentioned cropped area fixing processing in the panorama creating section 120 will be described. For panoramas, height is more important than width. Hence, the panorama creating section 120 fixes a rectangular area that is maximized height-wise, as a cropped area, as mentioned above.

Figure 5:
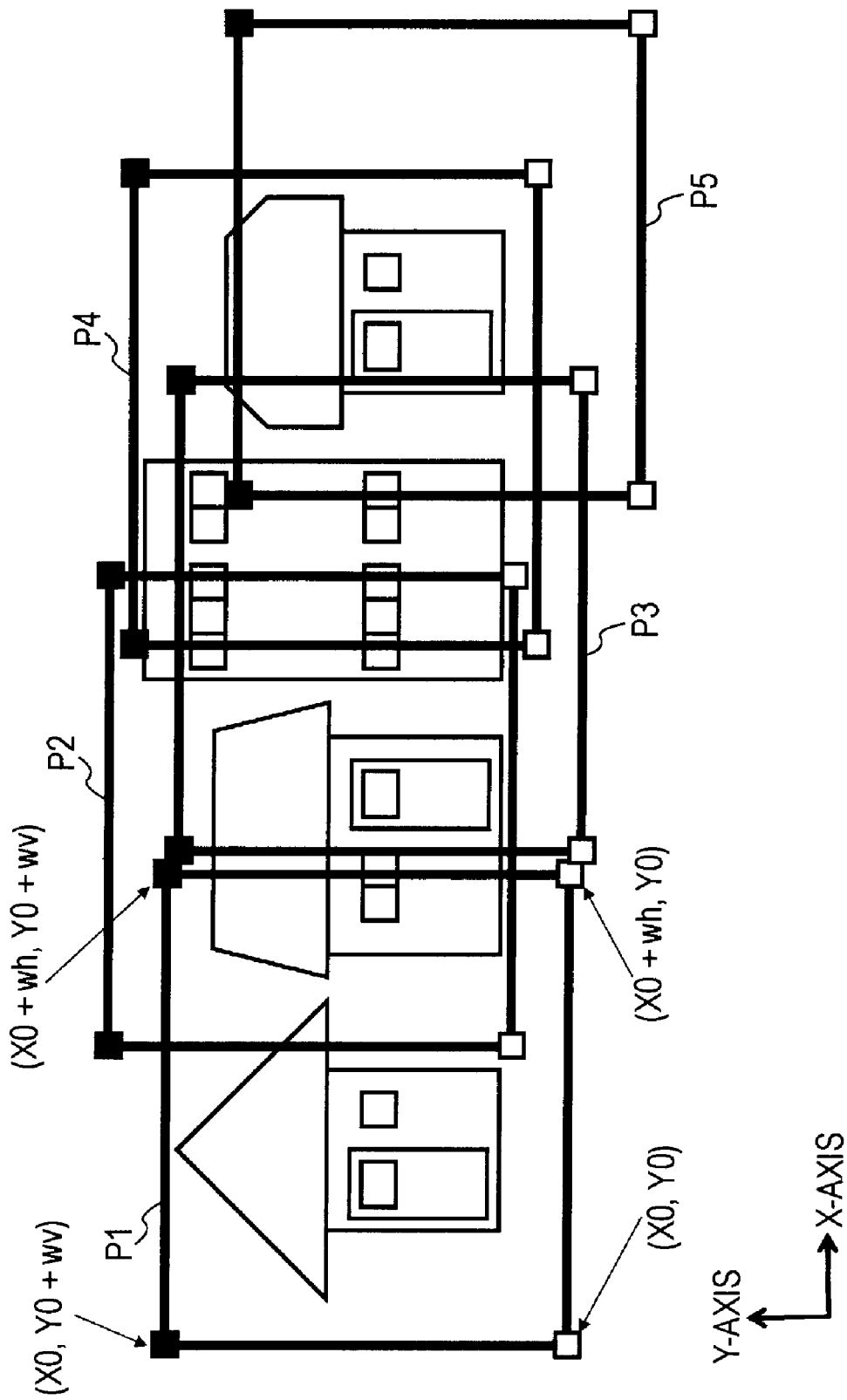
FIG. 5 is a diagram showing open squares as lower-left and lower-right vertices and solid squares as upper-left and upper-right vertices, of multiple images P1-P5 used at the time of creating a panorama.

FIG. 5 shows open squares for lower-left and lower-right vertices and solid squares for upper-left and upper-right vertices, of each of the images P1-P5. Positions of these points are fixed by fixing the lower-left positions (X0,Y0)-(X4,Y4) of the respective images P1-P5 through the above-mentioned multiple image aligning processing in step ST3 of FIG. 2. For example, the positions of the vertices of the image P1 are fixed as follows (see FIG. 5), where "wh" is the horizontal pixel width of the image, and "wv" is its vertical pixel width.

The position of the lower-left vertex of the image P1 is (X0,Y0), and the position of the upper-left vertex of the image P1 is (X0,Y0+wv). Furthermore, the position of the lower-right vertex of the image P1 is (X0+wh,Y0), and the position of the upper-right vertex of the image P1 is (X0+wh,Y0+wv). The positions of the vertices of each of the images P2-P5 are similarly fixed.

Figure 6:
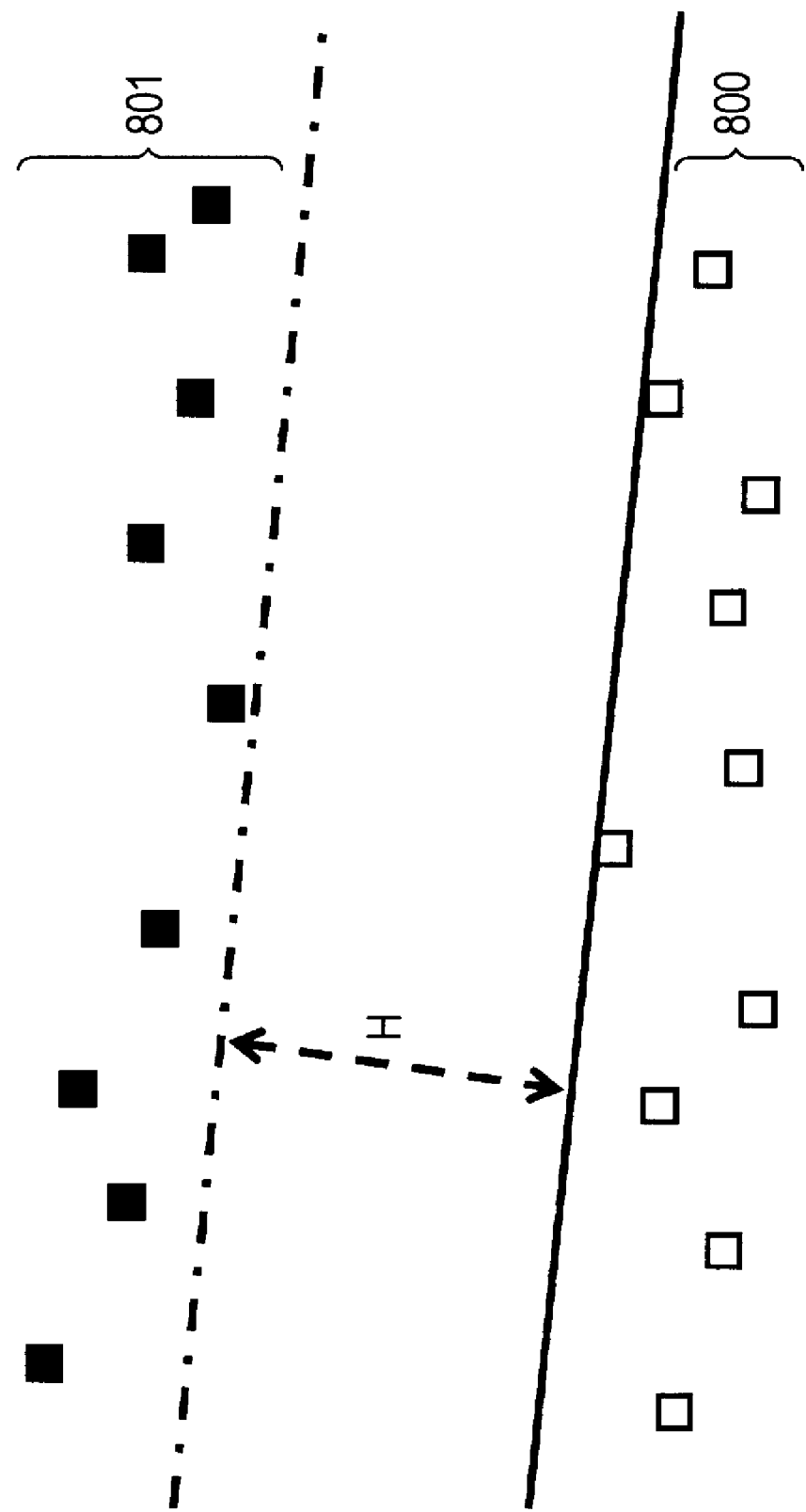
FIG. 6 is a diagram for illustrating that selecting the largest rectangular area height-wise amounts to a problem of selecting a rectangular area having a maximum height from among rectangular areas present on the upper side of the open squares and on the lower side of the solid squares.

Selecting a rectangular area that is maximized height-wise amounts to a problem of selecting a rectangular area having a maximum height from among rectangular areas present on the upper side of the open squares and on the lower side of the solid squares. This problem may be generalized such that, as shown in FIG. 6, a rectangular area having a maximum height (H) is to be selected from among rectangular areas present on the upper side of a given point group 800 (open squares) and on the lower side of a given point group 801 (solid squares). In FIG. 6, a base (a side connecting the lower-left vertex to the lower-right vertex) of a rectangular area is denoted by a solid line, and a summit (a side connecting the upper-left vertex to the upper-right vertex) of the rectangular area is denoted by a dot-dash line.

Figure 7:
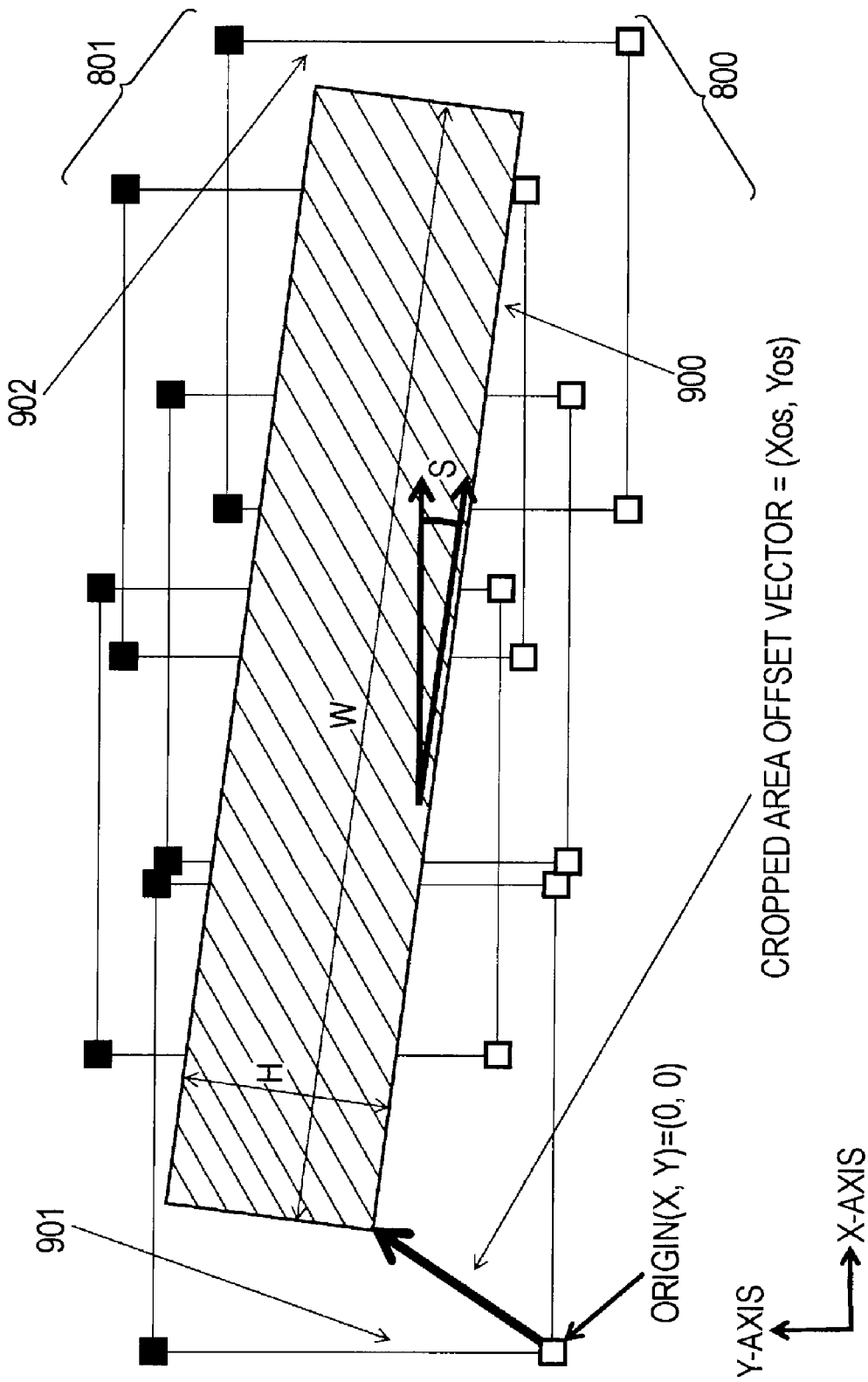
FIG. 7 is a diagram for illustrating the problem of selecting a rectangular area having a maximum height (H) from among rectangular areas present on the upper side of a given point group (open squares) and on the lower side of a given point group (solid squares)

This problem will be described more precisely with reference to FIG. 7. That is, let the first point group 800 (denoted by open squares in FIG. 7) and the second point group 801 (denoted by solid squares in FIG. 7) be given on a two-dimensional (X,Y) plane. The problem here is how to select a rectangular area (900 in FIG. 7) having a maximum height H from among rectangular areas present on the upper side of the first point group 800 and on the lower side of the second point group 801.

Of course, the following first and second conditions have to be satisfied. The first condition is that the rectangular area stays farther on the right side than a straight line (901 of FIG. 7) including a leftmost point (point having the smallest X-coordinate) in the first point group 800 (denoted by the open squares of FIG. 7) and parallel to the Y-axis. The second condition is that the rectangular area stays farther on the left side than a straight line (902 of FIG. 7) including a rightmost point (point having the largest X-coordinate) in the first point group 800 (denoted by the open squares of FIG. 7) and parallel to the Y-axis.

Since the left side and the right side of each image are parallel to the Y-axis, the same conditions may apply even if the leftmost point in the first point group 800 is replaced with a leftmost point in the second point group 801, and even if the rightmost point in the first point group 800 is replaced with a rightmost point in the second point group 801.

Furthermore, finding the rectangular area amounts to finding a position (i.e., a cropped area offset vector) (Xos,Yos) of the lower-left vertex of the rectangular area, an inclination angle S of the cropped area, a width W of the cropped area, and a height H of the cropped area. Here, the width W is the distance (length of the base) between the lower-left vertex and the lower-right vertex, or the distance (length of the summit) between the upper-left vertex and the upper-right vertex. The height H is the distance (length of a left side) between the lower-left vertex and the upper-left vertex, or the distance (length of a right side) between the lower-right vertex and the upper-right vertex. The inclination angle S is the angle formed between the X-axis and the base (or the summit); if the base is parallel to the X-axis, the inclination angle S is 0°, if the base inclines down rightward, the angle becomes negative, and if the base inclines up rightward, the angle becomes positive. In FIG. 7, an example is shown in which the inclination angle S is negative.

[Rules Applied to Cropped Area Fixing Processing]

Here, before illustrating a procedure for the cropped area fixing processing, important rules established this time will be described.

An angle S' is set to an arbitrary value, where $-90° < S' < 90°$. At this time, a straight line having the smallest Y-intercept value is to be found from among straight lines each touching one point (including one point) in a second point group given in a two-dimensional XY space and having the angle S'. Set the point in the second point group at this time to Pb, the straight line to Lb, and the Y-intercept value to Yb. Furthermore, a straight line having the largest Y-intercept value is to be found from among straight lines each touching one point (including one point) in a first point group given in the two-dimensional XY space and having the angle S'. Set the point in the first point group at this time to Pa, the straight line to La, and the Y-intercept value to Ya.

Let a "distance considering a direction" between the straight lines La and Lb be H(S'), where the "distance considering a direction" is defined to be a Euclidean distance (0 or a positive value) between the two straight lines La and Lb if $Ya \leq Yb$, and a value (negative value) obtained by multiplying the Euclidean distance between the two straight lines La and Lb with (−1) if $Ya > Yb$. Since H depends on S', the height is explicitly labeled H(S'). Let an angle formed between the direction of a vector starting at Pa and ending at Pb and the X-axis be denoted P (the angle P may be in a range of $-180° < P \leq 180°$).

Figure 8:
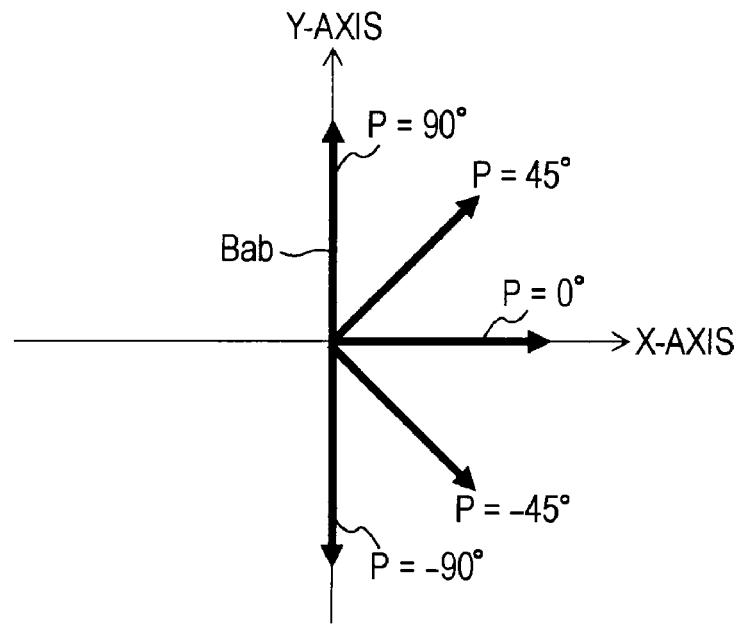
FIG. 8 is a diagram for illustrating an angle P formed between the X-axis and a direction of a vector starting at a point Pa in a first point group which touches a rectangular area and ending at a point Pb in a second point group which touches the rectangular area.

For example, as shown in FIG. 8, if a vector Bab starting at Pa and ending at Pb heads in a positive direction along the X-axis, P=0°, if this vector Bab heads in a positive direction along the Y-axis, P=90°, and if this vector Bab heads in a negative direction along the Y-axis, P=−90°. Furthermore, if Pa=Pb, this vector Bab is a zero vector, but it is set such that P=−90° for convenience.

[Rule 1]
If P=−90°, $H(S'') \leq 0$ for any S'' ($-90° < S'' < 90°$).

[Rule 2]
If $-90° < P < (S'+90)°$, $H(S'') < H(S')$ for any S'' ($-90° < S'' < 90°$ satisfying $S' < S''$).

[Rule 3]
If P=S'+90°, $H(S'') \leq H(S')$ for any S'' ($-90° < S'' < 90°$).

[Rule 4]
If "$-180° < P < -90°$" or "$(S'+90)° < P \leq 180°$", $H(S'') < H(S')$ for any S'' ($-90° < S'' < 90°$) satisfying $S'' < S'$.

Figure 9:
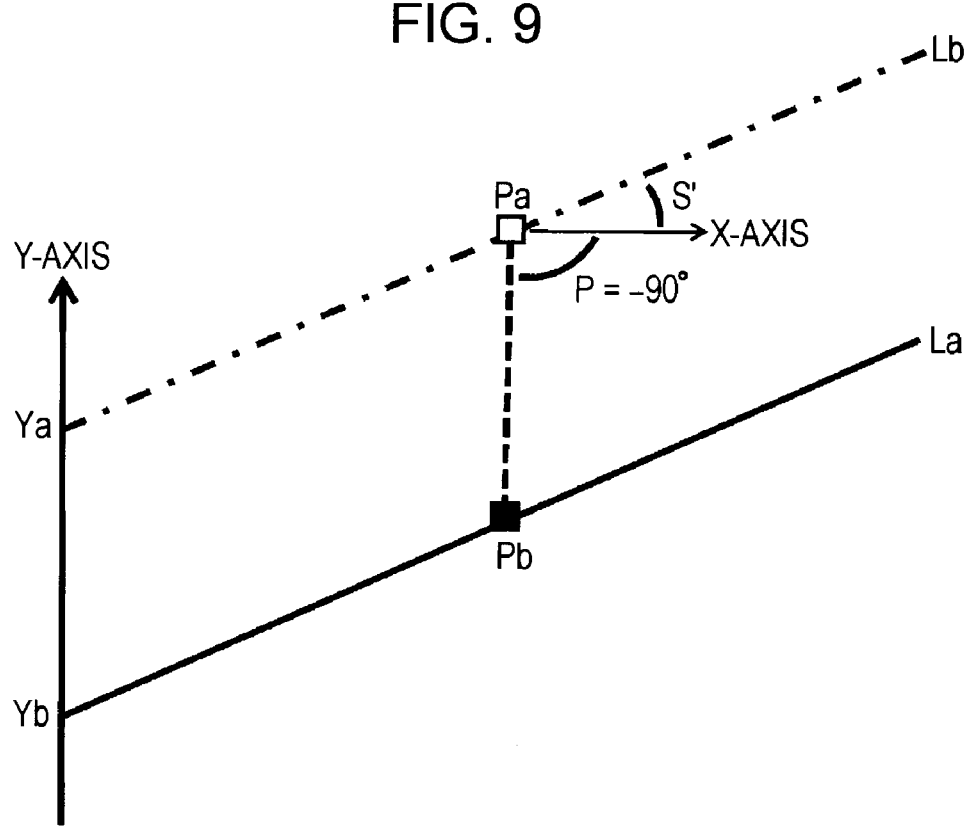
FIG. 9 is a diagram showing an example (0°<S'<90° and P=−90°) according to a rule 1.
Figure 10:
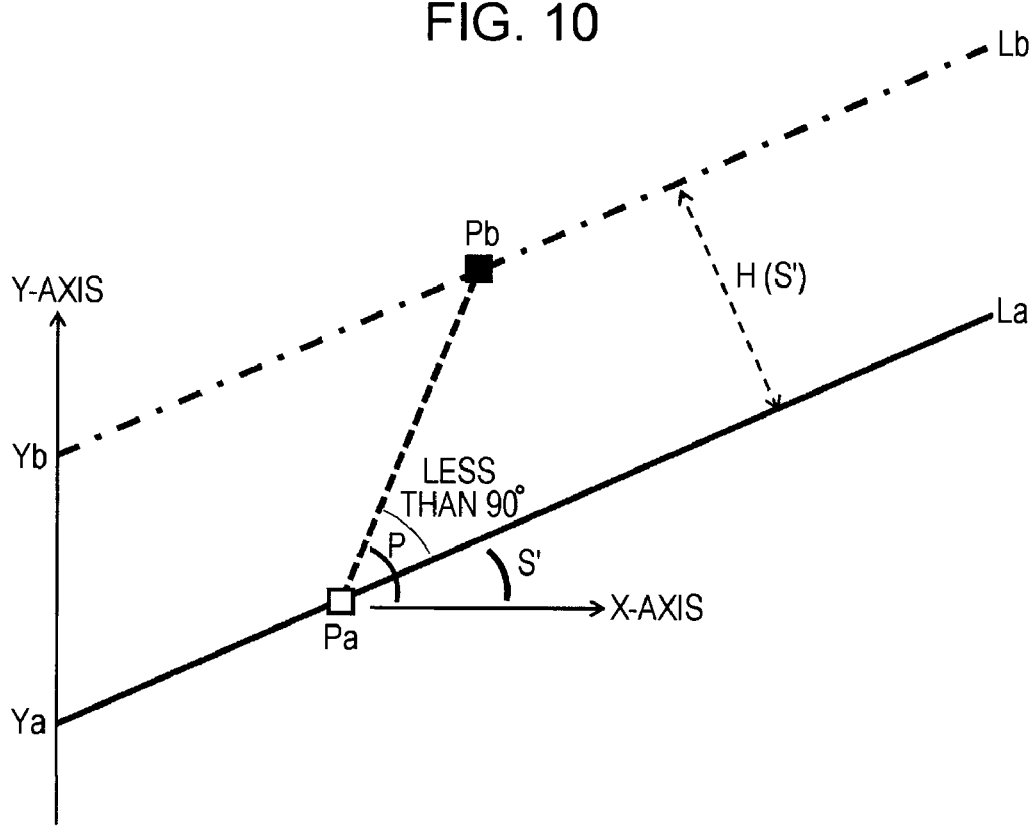
FIG. 10 is a diagram showing an example (0°<S'<90° and S'<P<(S'+90)°) according to a rule 2.

How these rules establish themselves will be described with reference to FIGS. 9-11. FIG. 9 shows an example according to the rule 1, where 0°<S'<90° and P=−90°. In this example, H(S') obviously becomes negative irrespective of any inclination angle S' for the straight lines La and Lb. FIG. 10 shows an example according to the rule 2, where 0°<S'<90° and S'<P<(S'+90)°. In this example, H(S') obviously decreases with increasing inclination angle S' for the straight lines La and Lb.

Figure 11:
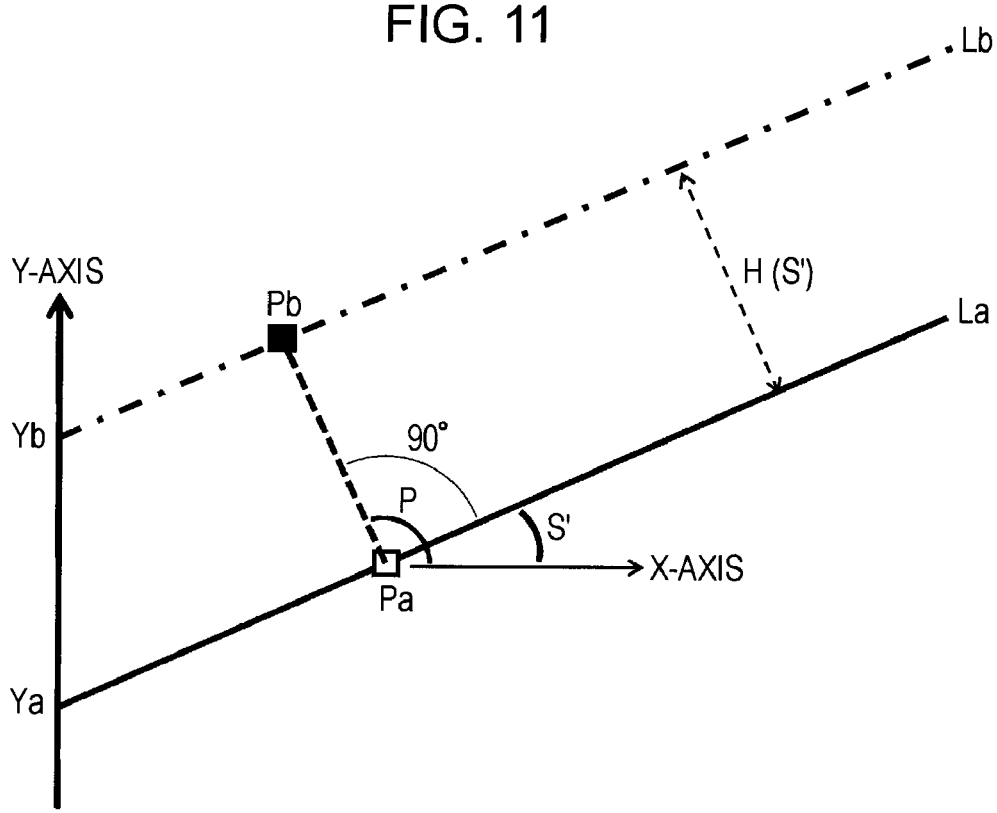
FIG. 11 is a diagram showing an example (0°<S'<90° and P=(S'+90)°) according to a rule 3.
Figure 12:
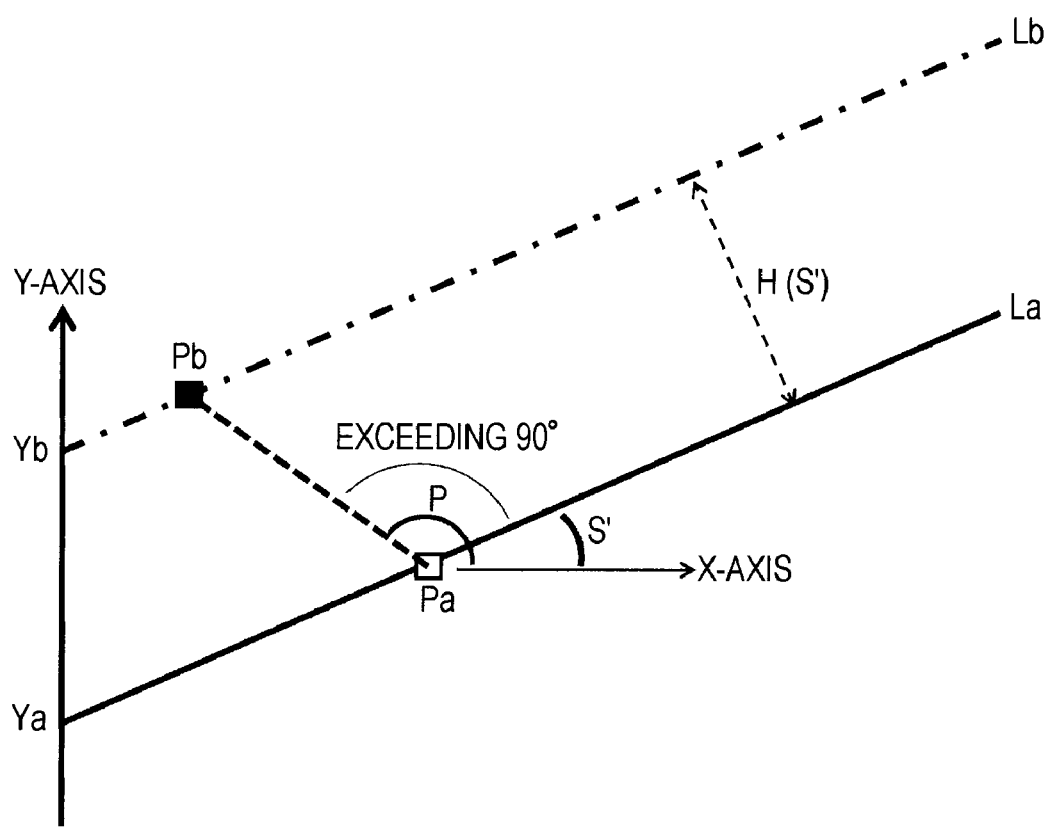
FIG. 12 is a diagram showing an example (0°<S'<90° and (S'+90)°<P≦180°) according to a rule 4.

FIG. 11 shows an example according to the rule 3, where 0°<S'<90° and P=(S'+90)°. In this example, H(S') obviously decreases with increasing or decreasing inclination angle S' for the straight lines La and Lb. FIG. 12 shows an example according to the rule 4, where 0°<S'<90° and (S'+90)°<P≦180°. In this example, H(S') obviously decreases with decreasing inclination angle S' for the straight lines La and Lb.

Considering other examples in similar ways, it is obvious that the above-mentioned rules 1-4 likewise establish themselves. Note that if a restriction that "an angle formed between the base and the X-axis is S'" is given to the problem to be now solved, it is obvious that the above-mentioned La and Lb are the base and the summit of a rectangular area to be found, respectively.

[Procedure for Cropped Area Fixing Processing]

Figure 13:
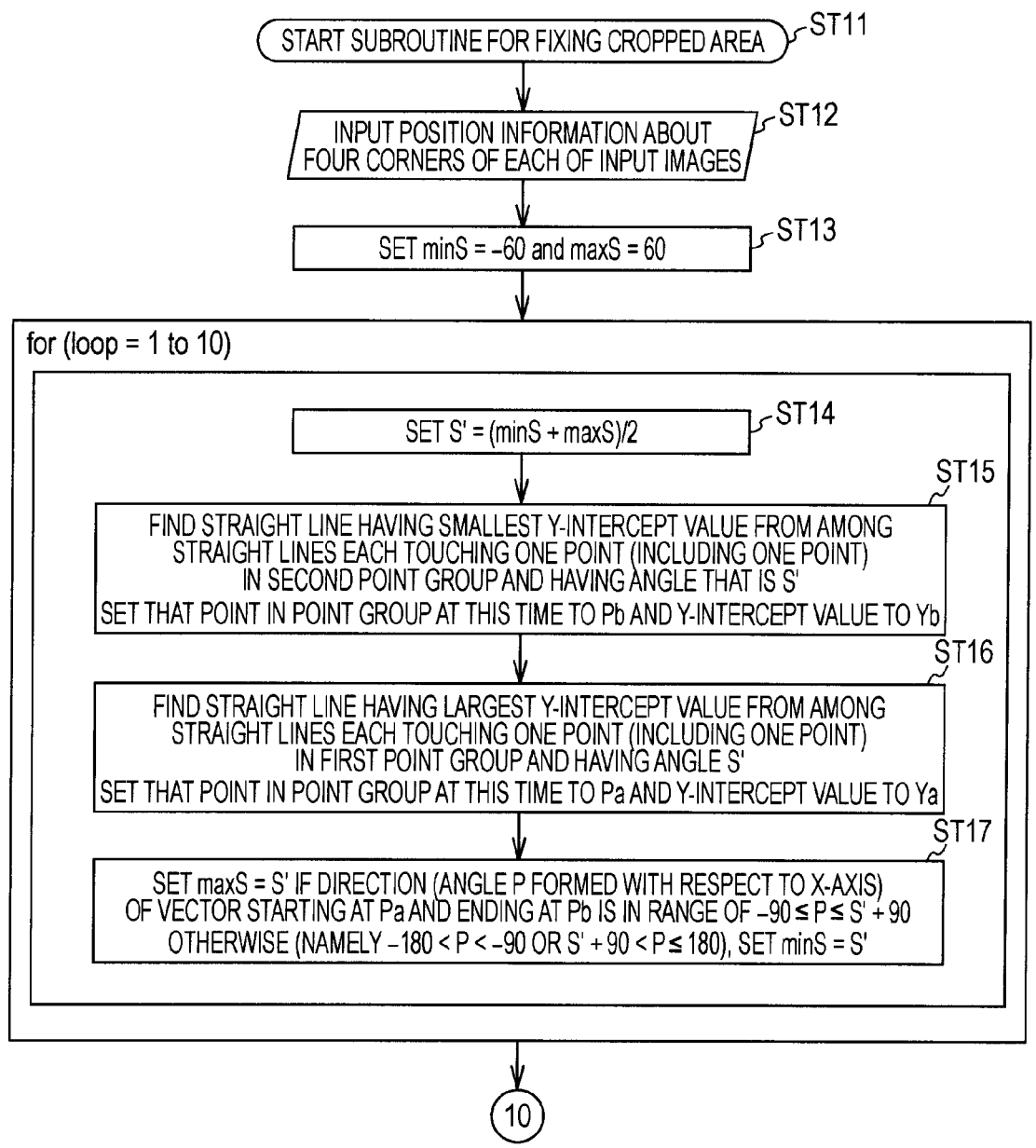
FIG. 13 is a flowchart (1/3) for illustrating a procedure for cropped area fixing processing in the panorama creating section.
Figure 14:
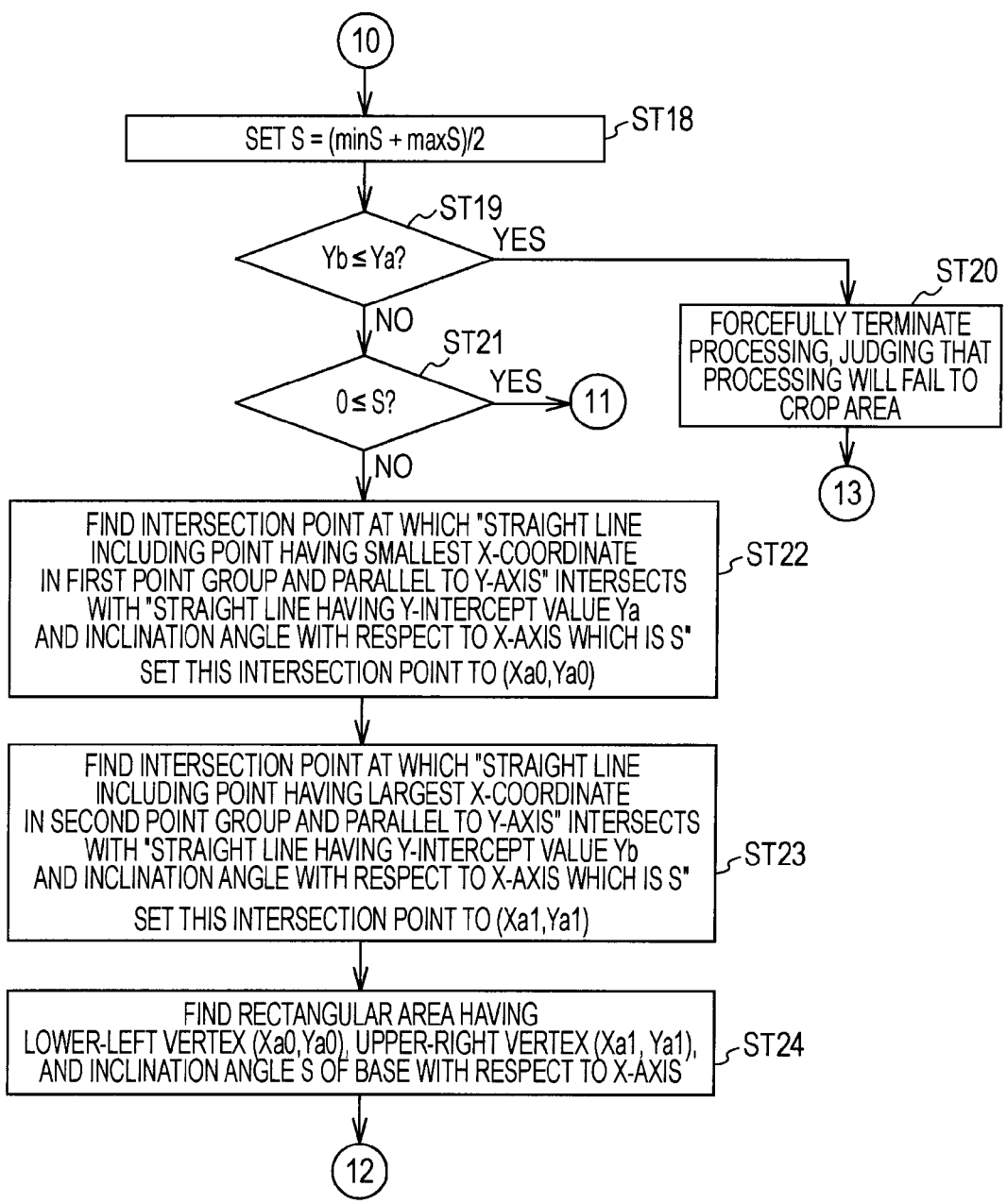
FIG. 14 is another flowchart (2/3) for illustrating the procedure for the cropped area fixing processing in the panorama creating section.
Figure 15:
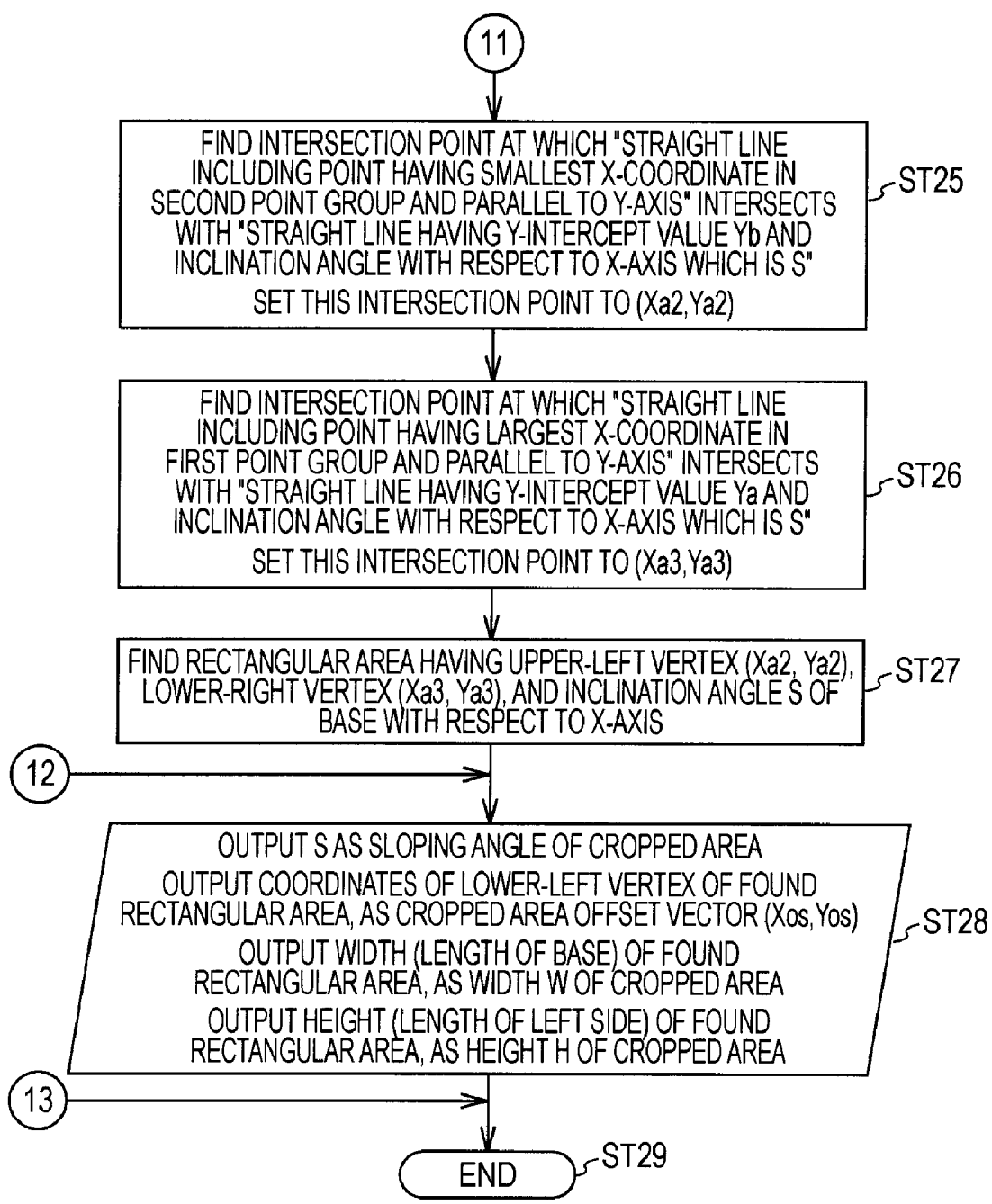
FIG. 15 is still another flowchart (3/3) for illustrating the procedure for the cropped area fixing processing in the panorama creating section.

The procedure for the cropped area fixing processing (step ST4 of FIG. 2) in the panorama creating section 120 will be described. Flowcharts of FIGS. 13-15 show the procedure.

The panorama creating section 120 starts its processing in step ST11. Then, in step ST12, the panorama creating section 120 inputs position information about four corners of each of input images, i.e., multiple images used to create a panorama. The position information about the four corners of each of the multiple images is fixed simultaneously when the positions of these images are fixed through their alignment (step ST3 of FIG. 2), as mentioned above.

Next, in step ST13, the panorama creating section 120 sets inclination angles for consideration. Since the user does not usually shoot images with his/her camera inclined, the inclination angles would reasonably be set within a range of ±60°. In step ST13, minS=−60° and maxS=60°. These minS and maxS specify a search range for the inclination angle of a cropped area (rectangular area) for maximizing the height of that area, and become narrowed while updated in the subsequent processing.

After step ST13, the panorama creating section 120 moves to a loop of steps ST14-ST17. The panorama creating section 120 repeats the loop of steps ST14-ST17 a predetermined number of times, i.e., ten times in this embodiment, after which it moves to step ST18. As later described, since performing the loop one time can halve the search range (range from minS to maxS) for the inclination angle, by performing the loop ten times, the inclination angle of a cropped area (rectangular area) for maximizing the height of that area can be found with the following accuracy. For higher accuracy, one may increase the number of times for performing the loop.

$$\{(\text{max}S \text{ set in step } ST13) - (\text{min}S \text{ set in step } ST13)\} \div 2^{10} = (120 \div 1024)°$$

In step ST14, the panorama creating section 120 sets S'= (maxS+minS)÷2 in order to examine a middle value {(maxS+minS)÷2} of the range currently designated as a search range. Then, the panorama creating section 120 moves to step ST15.

In this step ST15, the panorama creating section 120 finds a straight line having the smallest Y-intercept value from among straight lines each touching one point (including one point) in a second point group (a set of upper-left and upper-right vertices of each of the input images) and having an inclination angle that is S'. Specifically, the panorama creating section 120 finds, for each of all points in the second point group, a straight line passing through that point and having the inclination angle S', and calculates Y-intercept values. Then, the panorama creating section 120 has only to find the smallest one of these Y-intercept values. Set that point in the point group at this time to Pb, and the Y-intercept value to Yb. Then, the panorama creating section 120 moves to step ST16.

In this step ST16, the panorama creating section 120 finds a straight line having the largest Y-intercept value from among straight lines each touching one point (including one point) in a first point group (a set of lower-left and lower-right vertices of each of the input images) and having the inclination angle S'. Specifically, the panorama creating section 120 finds, for each of all points in the first point group, a straight line passing through that point and having the inclination angle S', and calculates Y-intercept values. Then, the panorama creating section 120 has only to find the largest one of these Y-intercept values. Set that point in the point group at this time to Pa, and the Y-intercept value to Ya. Then, the panorama creating section 120 moves to step ST17. Through the above-mentioned steps ST15 and ST16, a band-shaped area is selected, which has a maximum height and which satisfies the condition that the area is on the upper side of the first point group and on the lower side of the second point group, from among band-shaped areas each having the angle S'.

In step ST17, the panorama creating section 120 sets maxS=S' if the direction (the angle P formed with respect to the X-axis) of a vector starting at Pa and ending at Pb is within a range of −90≦P≦S'+90. Otherwise (i.e., if −180<P<−90 or S'+90<P≦180), the panorama creating section 120 sets minS=S'. By performing this setting, either maxS or minS is updated, to halve a range to be searched next.

After step ST17, the panorama creating section 120 proceeds to step ST18 if the series of processing steps, steps ST14-ST17, has been performed a predetermined number of times, i.e., ten times. If the processing has been performed less than the predetermined number of times, the panorama creating section 120 returns to step ST14. Through the above-mentioned processing steps ST17 and ST14, a new candidate for the angle S' is selected on the basis of the first point Pa in the first point group touching the band-shaped area selected through steps ST15 and ST16, the second point Pb in the second point group touching this band-shaped area, and the angle S'. By the selecting of the band-shaped area in steps ST15 and ST16 and the selecting of the new candidate angle S' in steps ST17 and ST14 being repeated, a band-shaped area which is largest height-wise and which satisfies the condition that the area is on the upper side of the first point group and on the lower side of the second point group, is determined.

The panorama creating section 120 narrows the search range in step ST17, and it is clear from the previously mentioned rules that this narrowing method is appropriate. That is, if P fits "Rule 2", it is meaningless to search for values larger than S'. Hence, by setting maxS=S', any value larger than S' is thereafter excluded from the search range. Similarly, if P fits "Rule 4", it is meaningless to search for values smaller than S'. Hence, by setting minS=S', any value smaller than S' is thereafter excluded from the search range.

Moreover, if P fits "Rule 1" (P=−90°), H(S') does not become positive irrespective of any inclination angle of the cropped area (rectangular area). Hence, no cropped area (rectangular area) is to be found (there is no solution to the given problem). If P=−90°, special case processing may be performed. However, in this embodiment, for consistency of the processing, the loop of steps ST14-ST17 is performed the prescribed number of times under maxS=S', and a judgment is thereafter made that "no cropped area (rectangular area) has been found".

Furthermore, if P fits "Rule 3" (P=(S'+90)°), H(S') is maximized at a current value S'. Hence, it is this current value S' that is the inclination angle to be found. The inclination angle to be found is available at this point of the processing. However, in this embodiment, for consistency of the processing, the loop of steps ST14-ST17 is performed the prescribed number of times under maxS=S'.

When the processing reaches step ST18, the search range has been sufficiently narrowed, and hence the angle to be found is between minS and maxS at this point of the processing. Thus, by setting S=(minS+maxS)÷2, S represents the inclination angle to be found with sufficient accuracy. In step ST18, the panorama creating section 120 determines the inclination angle S of a band-shaped area, i.e., a cropped area, having a maximum height, which satisfies the condition that the band-shaped area is on the upper side of the first point group and on the lower side of the second point group, as S=(minS+maxS)÷2.

Next, in step ST19, the panorama creating section 120 evaluates the values Ya and Yb, where Ya is the Y-intercept of a straight line including the base of the rectangular area to be found, and Yb is the Y-intercept of a straight line including the summit of the rectangular area to be found. Accordingly, unless Yb>Ya, no rectangular area is found (there is no solution to the given problem). Thus, the panorama creating section 120 judges whether or not Yb≦Ya in step ST19.

If Yb≦Ya, the panorama creating section 120 moves to step ST20. In this step ST20, the panorama creating section 120 forcefully terminates the cropped area fixing processing, judging that no rectangular area exists and that it will thus fail to crop a rectangular area. Then, in step ST29, the panorama creating section 120 terminates the series of processing steps.

Meanwhile, unless Yb≦Ya, i.e., if Yb>Ya in step ST19, the panorama creating section 120 judges that it can crop a rectangular area, and thus moves to step ST21. Here, processing is different in different inclination angles S, namely 0 or more degrees, and less than 0°. Thus, the panorama creating section 120 judges whether or not 0≦S in step ST21.

Figure 16:
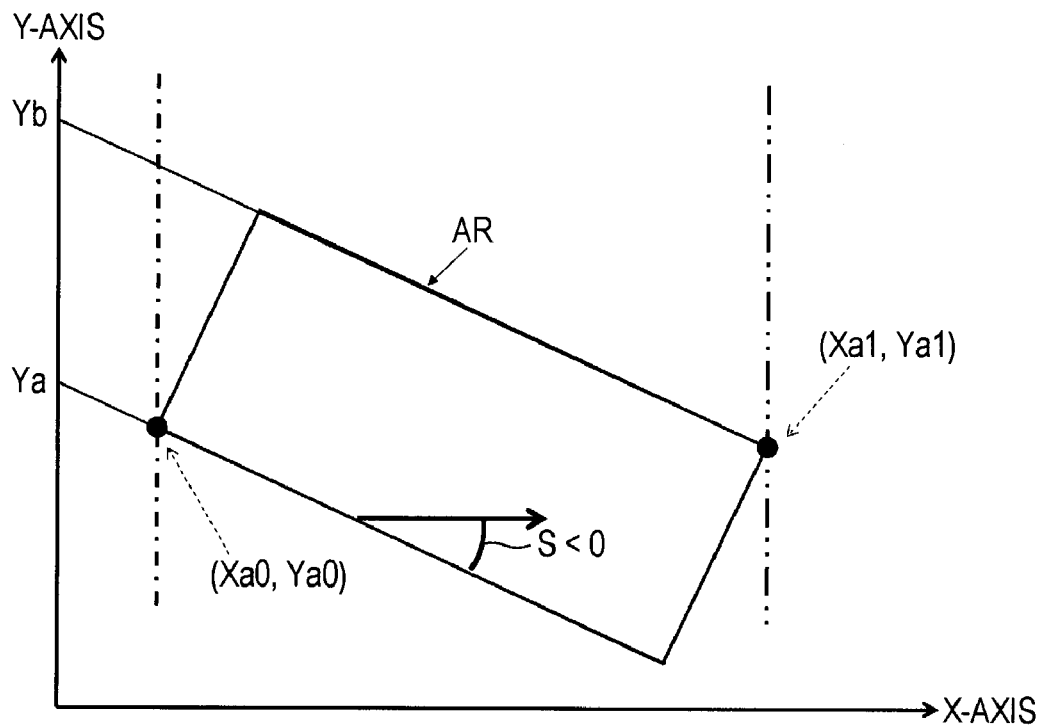
FIG. 16 is a diagram showing a state of a rectangular area AR to be found if an inclination angle S is negative.

Unless 0≦S, i.e., if 0>S, the panorama creating section 120 proceeds to step ST22. In this case, since the inclination angle S is negative, a rectangular area AR to be found is in a state such as shown in FIG. 16. In the figure, a dot-dash line indicates a leftmost one of left ends of multiple input images, and a dot-dot-dash line indicates a rightmost one of right ends of the multiple input images. A rectangular area having a maximum inclination angle S surrounded by the dot-dash line and the dot-dot-dash line is the rectangular area AR to be found.

The panorama creating section 120 finds, in step ST22, an intersection point at which "a straight line including a point having the smallest X-coordinate in the first point group and parallel to the Y-axis" intersects with "a straight line having the Y-intercept value Ya and an inclination angle with respect to the X-axis which is S". Set this intersection point to (Xa0, Ya0) as shown in FIG. 16. Then, the panorama creating section 120 moves to step ST23.

In this step ST23, the panorama creating section 120 finds an intersection point at which "a straight line including a point having the largest X-coordinate in the second point group and parallel to the Y-axis" intersects with "a straight line having the Y-intercept value Yb and the inclination angle with respect to the X-axis which is S". Set this intersection point to (Xa1, Ya1) as shown in FIG. 16. Then, the panorama creating section 120 moves to step ST24.

In this step ST24, the panorama creating section 120 finds a rectangular area having the lower-left vertex (Xa0,Ya0), the upper-right vertex (Xa1,Ya1), and the inclination angle S of the base with respect to the X-axis. It is this rectangular area that is the rectangular area AR to be found. After step ST24, the panorama creating section 120 moves to step ST28.

Figure 17:
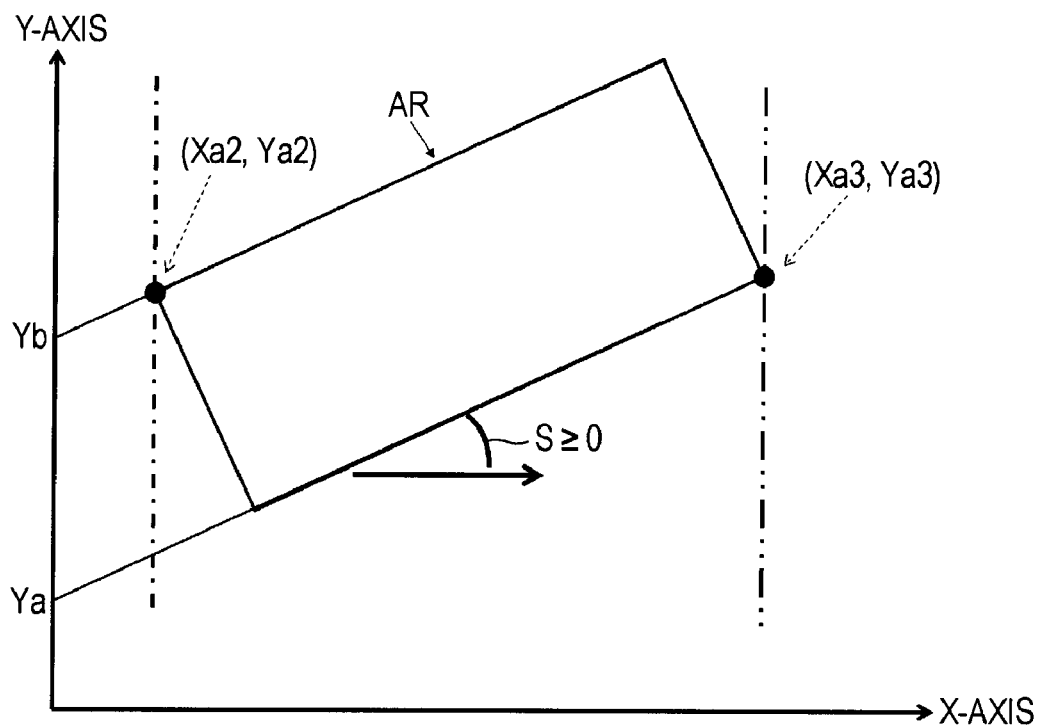
FIG. 17 is a diagram showing a state of the rectangular area AR to be found if the inclination angle S is positive.

Meanwhile, if 0≦S in step ST21, the panorama creating section 120 proceeds to step ST25. In this case, since the inclination angle S is 0 or positive, a rectangular area AR to be found is in a state such as shown in FIG. 17. In the figure, a dot-dash line indicates a leftmost one of left ends of multiple input images, and a dot-dot-dash line indicates a rightmost one of right ends of the multiple input images. A rectangular area having a maximum inclination angle S surrounded by the dot-dash line and the dot-dot-dash line is the rectangular area AR to be found.

The panorama creating section 120 finds, in step ST25, an intersection point at which "a straight line including a point having the smallest X-coordinate in the second point group and parallel to the Y-axis" intersects with "a straight line having the Y-intercept value Yb and the inclination angle with respect to the X-axis which is S". Set this intersection point to (Xa2,Ya2) as shown in FIG. 17. Then, the panorama creating section 120 moves to step ST26.

In this step ST26, the panorama creating section 120 finds an intersection point at which "a straight line including a point having the largest X-coordinate in the first point group and parallel to the Y-axis" intersects with "a straight line having the Y-intercept value Ya and the inclination angle with respect to the X-axis which is S". Set this intersection point to (Xa3, Ya3) as shown in FIG. 17. Then, the panorama creating section 120 moves to step ST27.

In this step ST27, the panorama creating section 120 finds a rectangular area having the upper-left vertex (Xa2,Ya2), the lower-right vertex (Xa3,Ya3), and the inclination angle S of the lower side with respect to the X-axis. It is this rectangular area that is the rectangular area AR to be found. After step ST27, the panorama creating section 120 moves to step ST28.

When the processing reaches step ST28, the rectangular area AR to be found as a cropped area is available. Thus, in this step ST28, the panorama creating section 120 outputs information about this rectangular area AR.

That is, the panorama creating section 120 outputs S as the inclination angle of the cropped area, and outputs the coordinates of the lower-left vertex of the found rectangular area as the cropped area offset vector (Xos, Yos). Also, the panorama creating section 120 outputs a width (length of the lower side) of the found rectangular area as the width W of the cropped area, and outputs a height (length of the left side) of the found rectangular area as the height H of the cropped area.

After step ST28, the panorama creating section 120 terminates the series of processing steps, in step ST29.

As described above, in the digital camera 100 shown in FIG. 1, the panorama creating section 120 of the digital signal processor 114 automatically determines a cropped area (rectangular area) to be cropped as a panorama from multiple images, as follows. That is, in the panorama creating section 120, chosen to be the cropped area is a rectangular area having a maximum height, which satisfies the condition that the rectangular area is on the upper side of a first point group (lower-left positions and lower-right positions of the multiple images) and on the lower side of a second point group (upper-left positions and upper-right positions of the multiple images).

Accordingly, in the panorama creating section 120, a panorama is created by cropping a rectangular area having a maximum height from multiple images, so that a good panorama can be obtained. In addition, the cropped area is automatically determined, so that the user can obtain the panorama quickly without spending too much time on his/her manual work as in the past.

2. Modified Embodiment

In the above-described embodiment, an example has been described in which a panorama is created from multiple images by the panorama creating section 120 within the digital signal processor 114 of the digital camera 100 under the control of the CPU 101. However, a panorama may be created within a computer by transmitting multiple images captured by a digital camera to the computer. In this case, although a description will not be given in detail, even in the computer, the panorama can be created satisfactorily by automatically determining a cropped area (rectangular area) through processing similar to the above-described processing performed in the panorama creating section 120.

Figure 18:
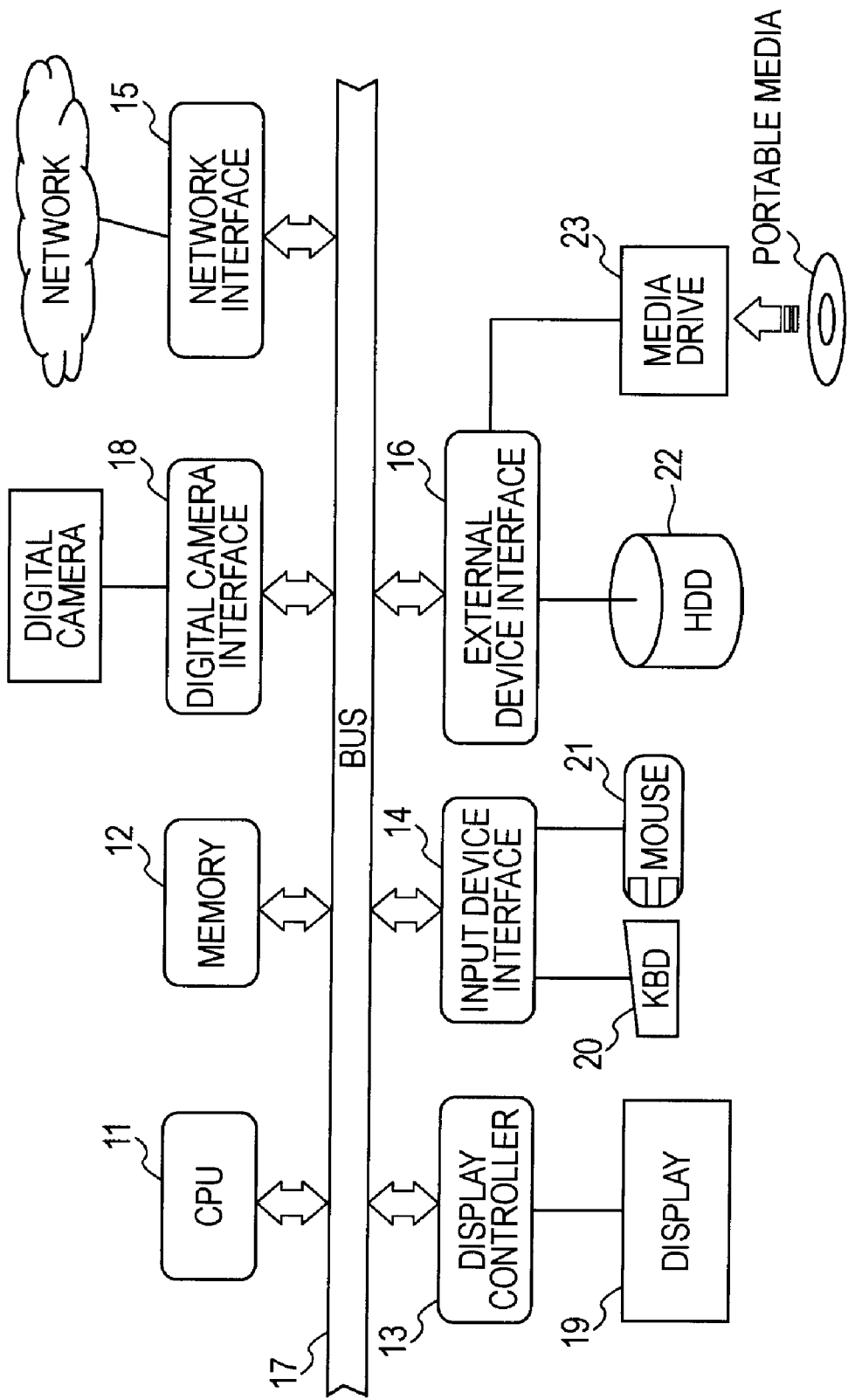
FIG. 18 is a block diagram showing a configuration example of a computer used to create a panorama.
Figure 19:
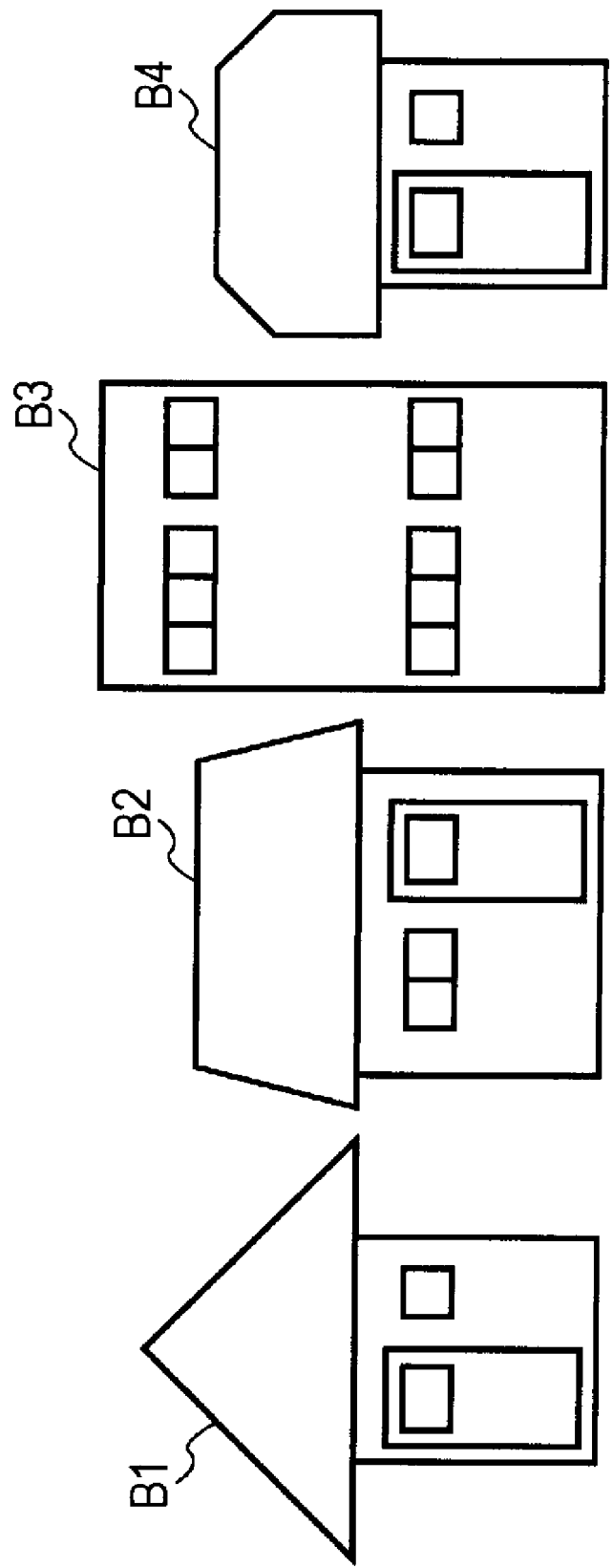
FIG. 19 is a diagram showing an example of a scene of buildings B1-B4.

FIG. 18 shows a configuration example of a computer 200 used to create panoramas.

The computer 200 has a CPU (Central Processing Unit) 11, a memory 12, a display controller 13, an input device interface 14, and a network interface 15. Also, the computer 200 has an external device interface 16 and a digital camera interface 18. These components are connected to a bus 17.

A display 19 is connected to the bus 17 via the display controller 13. A keyboard (KBD) 20 and a mouse 21 are connected to the bus 17 via the input device interface 14. Also, a hard disk drive (HDD) 22 and a media drive 23 are connected to the bus 17 via the external device interface 16. A digital camera is connected to the bus 17 via the digital camera interface 18. Moreover, the computer 200 is connected to a network such as the Internet via the network interface 15.

The CPU 11 is a main controller of the computer 200. This CPU 11 executes various applications under the control of an operating system (OS). The CPU 11 can execute, e.g., application programs processing images once downloaded to the hard disk drive 22 from the digital camera. In the application programs, the series of processing programs performing the above-described panorama creating processing is implemented. The CPU 11 is interconnected with the other components and devices via the bus 17.

The memory 12 is a storage device used to store program codes executed by the CPU 11 and to temporarily hold work data being executed. The memory 12 is configured to include both a nonvolatile memory such as a ROM and a volatile memory such as a DRAM.

The display controller 13 is a controller dedicated to actually processing drawing instructions issued by the CPU 11. Drawn data processed by the display controller 13 is tentatively written to, e.g., a frame buffer, not shown, and thereafter outputted onto a screen by the display 19. For example, an image read from the hard disk drive 22 is displayed on the screen by the display 19, allowing the user to view and enjoy it.

The input device interface 14 is a device for connecting user input devices such as the keyboard 20 and the mouse 21 to the computer 200. The user can enter commands and the like for reproducing images via the keyboard 20 and/or the mouse 21.

The network interface 15 connects the computer 200 to a limited area network such as a LAN (Local Area Network), and even to a wide area network such as the Internet, compliant with a predetermined communication protocol such as Ethernet (registered trademark).

On the network, a plurality of host terminals and servers, not shown, are connected transparent, thus constructing a distributed computing environment. On the network, distribution services for software programs, data content and the like can be provided. For example, from a server in which an image shot by another person is saved, the user can download data on that image to the hard disk drive 22 via the network.

The digital camera interface 18 is a device for introducing images supplied from the digital camera into the computer 200. The external device interface 16 is a device for connecting external devices such as the hard disk drive 22 and the media drive 23 to the computer 200.

The hard disk drive 22 is, as hitherto known, an external storage device fixedly incorporating therein a magnetic disk as a storage carrier, and is superior to other external storage devices in terms of storage capacity, data transfer speed and the like. Also, this hard disk drive 22 is capable of performing random access. Storing a software program on the hard disk drive 22 in an executable state is called "installing" the program in a system. Typically, in the hard disk drive 22, program codes of the operating system, the application programs, device drivers and the like to be executed by the CPU 11 are stored in a nonvolatile way. For example, the series of processing programs performing the above-described panorama creating processing may be installed in the hard disk drive 22.

The media drive 23 is a device for mounting thereon portable media such as a CD (Compact Disc), a MO (Magneto-Optical disc), and a DVD (Digital Versatile Disc), and accessing a data-recorded surface thereof. The portable media are mainly used to back up software programs, data files and the like, as computer-readable data, and move (including selling, circulating, and distributing) them between systems. Application programs for performing image processing may be physically circulated/distributed between a plurality of devices through use of these media.

Furthermore, in the above-described embodiments, an example has been shown in which the first point group is configured of lower-left and lower-right positions of multiple images captured by sequentially shifting their image capturing positions in a horizontal direction, and the second point group is configured of upper-left and upper-right positions of the multiple images. That is, in the above-described embodiments, the first direction in which the first point group extends side by side with the second point group is a vertical direction, whereas the second direction serving as a reference for the inclination angle of a rectangular area as a cropped area is the horizontal direction.

However, the first direction in which the first point group extends side by side with the second point group is not limited to the vertical direction. For example, the embodiments of this invention may be applicable to a case where a panorama is created from multiple images captured by sequentially shifting their image capturing positions vertically. In such a case, the first point group is configured of upper-left and lower-left positions of the multiple images, the second point group is configured of upper-right and lower-right positions of the multiple images, and the first direction in which the first point group extends side by side with the second point group is a horizontal direction.

The present application contains subject matter related to that disclosed in Japanese Priority Patent Application JP 2008-319109 filed in the Japan Patent Office on Dec. 16, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a band-shaped area selecting section selecting, from among band-shaped areas each having a first angle with respect to a second direction orthogonal to a first direction in which a first point group extends side by side with a second point group, a first band-shaped area having a maximum height, which satisfies a condition that the first band-shaped area is on one side of the first point group, which is in a direction same as or opposite to the first direction and on one side of the second point group, which is in a direction opposite to or same as the first direction;
   an angle selecting section selecting a candidate for the first angle from among angles smaller or larger than the first angle, on the basis of relationships between a first point in the first point group which touches the first band-shaped area, a second point in the second point group which touches the first band-shaped area, and the first angle; and
   a control section effecting control to repeat selecting of the first band-shaped area by the band-shaped area selecting section and selecting of the candidate for the first angle by the angle selecting section, and obtaining the first band-shaped area finally selected by the band-shaped area selecting section, as a processing result.

2. The information processing apparatus according to claim 1, further comprising:
   an area cropping section cropping a rectangular area sandwiched between the first point group and the second point group, which is selected from the first band-shaped area as the processing result.

3. The information processing apparatus according to claim 1, wherein
   the first point group is configured of lower-left and lower-right positions of multiple images captured by sequentially shifting image capturing positions in a horizontal direction, and the second point group is configured of upper-left and upper-right positions of the multiple images.

4. An information processing method, comprising the steps of:
   selecting, from among band-shaped areas each having a first angle with respect to a second direction orthogonal to a first direction in which a first point group extends side by side with a second point group, a first band-shaped area having a maximum height, which satisfies a condition that the first band-shaped area is on one side of the first point group, which is in a direction same as or opposite to the first direction and on one side of the second point group, which is in a direction opposite to or same as the first direction; and
   selecting a candidate for the first angle from among angles smaller or larger than the first angle, on the basis of relationships between a first point in the first point group which touches the first band-shaped area, a second point in the second point group which touches the first band-shaped area, and the first angle;
   wherein by repeating the band-shaped area selecting step and the angle selecting step, the first band-shaped area finally selected in the band-shaped area selecting step is obtained as a processing result.

5. A non-transitory computer-read medium encoded with a program, when executed by a computer, causing the computer to function as:
   band-shaped area selecting means for selecting, from among band-shaped areas each having a first angle with respect to a second direction orthogonal to a first direction in which a first point group extends side by side with a second point group, a first band-shaped area having a maximum height, which satisfies a condition that the first band-shaped area is on one side of the first point group, which is in a direction same as or opposite to the first direction and on one side of the second point group, which is in a direction opposite to or same as the first direction;
   angle selecting means for selecting a candidate for the first angle from among angles smaller or larger than the first angle, on the basis of relationships between a first point in the first point group which touches the first band-shaped area, a second point in the second point group which touches the first band-shaped area, and the first angle; and
   control means for effecting control to repeat selecting of the first band-shaped area by the band-shaped area selecting means and selecting of the candidate for the first angle by the angle selecting means, and obtaining the first band-shaped area finally selected by the band-shaped area selecting means, as a processing result.

6. An image processing apparatus comprising:
   an information processing section finding a band-shaped area from multiple images captured by sequentially shifting image capturing positions in a horizontal direction; and
   an area cropping section cropping a rectangular area sandwiched between a first point group and a second point group, which is selected from the band-shaped area found by the information processing section from the multiple images;
   wherein the information processing section has
   a band-shaped area selecting section selecting, from among band-shaped areas each having a first angle with respect to the horizontal direction, a first band-shaped area having a maximum height, which satisfies a condition that the first band-shaped area is on an upper side of the first point group configured of lower-left and lower-right positions of the multiple images and on a lower side of the second point group configured of upper-left and upper-right positions of the multiple images;
   an angle selecting section selecting a candidate for the first angle from among angles smaller or larger than the first angle, on the basis of relationships between a first point in the first point group which touches the first band-shaped area, a second point in the second point group which touches the first band-shaped area, and the first angle; and
   a control section effecting control to repeat selecting of the first band-shaped area by the band-shaped area selecting section and selecting of the candidate for the first angle by the angle selecting section, and obtaining the first band-shaped area finally selected by the band-shaped area selecting section, as a processing result.

7. An information processing apparatus comprising:
   a band-shaped area selector configured to select, from among band-shaped areas each having a first angle with respect to a second direction orthogonal to a first direction in which a first point group extends side by side with a second point group, a first band-shaped area having a maximum height, which satisfies a condition that the first band-shaped area is on one side of the first point group, which is in a direction same as or opposite to the first direction and on one side of the second point group, which is in a direction opposite to or same as the first direction;

an angle selector configured to select a candidate for the first angle from among angles smaller or larger than the first angle, on the basis of relationships between a first point in the first point group which touches the first band-shaped area, a second point in the second point group which touches the first band-shaped area, and the first angle; and a processor configured to repeat selecting of the first band-shaped area by the band-shaped area selector and selecting of the candidate for the first angle by the angle selector, and obtain the first band-shaped area finally selected by the band-shaped area selector, as a processing result.

8. An image processing apparatus comprising:

an information processor configured to find a band-shaped area from multiple images captured by sequentially shifting image capturing positions in a horizontal direction; and an area cropper configured to crop a rectangular area sandwiched between a first point group and a second point group, which is selected from the band-shaped area found by the information processor from the multiple images;

wherein the information processor has a band-shaped area selector configured to select, from among band-shaped areas each having a first angle with respect to the horizontal direction, a first band-shaped area having a maximum height, which satisfies a condition that the first band-shaped area is on an upper side of the first point group configured of lower-left and lower-right positions of the multiple images and on a lower side of the second point group configured of upper-left and upper-right positions of the multiple images;

an angle selector configured to select a candidate for the first angle from among angles smaller or larger than the first angle, on the basis of relationships between a first point in the first point group which touches the first band-shaped area, a second point in the second point group which touches the first band-shaped area, and the first angle; and a controller configured to repeat selecting of the first band-shaped area by the band-shaped area selector and selecting of the candidate for the first angle by the angle selector, and obtain the first band-shaped area finally selected by the band-shaped area selector, as a processing result.

* * * * *